United States Patent
Smith et al.

(10) Patent No.: US 12,517,858 B1
(45) Date of Patent: Jan. 6, 2026

(54) PMM/DC-MHS HPM INTERPOSER SYSTEM

(71) Applicant: Dell Products L.P., Round Rock, TX (US)

(72) Inventors: William Andrew Smith, Round Rock, TX (US); Michael Gregoire, Waltham, MA (US); Kevin Warren Mundt, Austin, TX (US); Stephen Strickland, Foxborough, MA (US); Quy Ngoc Hoang, Round Rock, TX (US); Anand Nunna, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/762,872

(22) Filed: Jul. 3, 2024

(51) Int. Cl.
*G06F 13/40* (2006.01)
*H01L 23/00* (2006.01)

(52) U.S. Cl.
CPC .......... *G06F 13/4081* (2013.01); *H01L 24/16* (2013.01); *H01L 2924/15311* (2013.01)

(58) Field of Classification Search
None
See application file for complete search history.

(56) References Cited

PUBLICATIONS

Wikipedia, The Free Encyclopedia, "Interposer," 1 page. Retrieved from the Internet: https://en.wikipedia.org/wiki/Interposer on Jul. 10, 2024.
SNIA SFF TWG Technology Affiliate, "SFF-TA-1034 Specification for Pluggable Multipurpose Module (PMM)," Draft, Rev. 0.0.5, Apr. 5, 2024, pp. 1, 10, 35-36. Available at https://www.snia.org/sff/specifications.

*Primary Examiner* — Farley Abad
*Assistant Examiner* — Dayton Lewis-Taylor
(74) *Attorney, Agent, or Firm* — Joseph Mencher

(57) ABSTRACT

A Pluggable Multipurpose Module (PMM)/Data Center-Modular Hardware System Host Processor Module (DC-MHS HPM) interposer includes an interposer board having a DC-MHS HPM connector subsystem that connects to a DC-MHS HPM, and a PMM connector subsystem that connects to a computing device. An interposer Baseboard Management Controller (BMC) on the interposer board is coupled to the DC-MHS HPM connector subsystem and configured to perform management operations on a DC-MHS HPM connected to the DC-MHS HPM connector subsystem. A power controller on the interposer board is coupled to the PMM connector subsystem and configured to be cabled to a DC-MHS HPM connected to the DC-MHS HPM connector subsystem. A translation subsystem on the interposer board is coupled to the DC-MHS HPM connector subsystem and the PMM connector subsystem and configured to perform PMM/DC-MHS HPM translations on data transmitted between the DC-MHS HPM connector subsystem and the PMM connector subsystem.

20 Claims, 18 Drawing Sheets

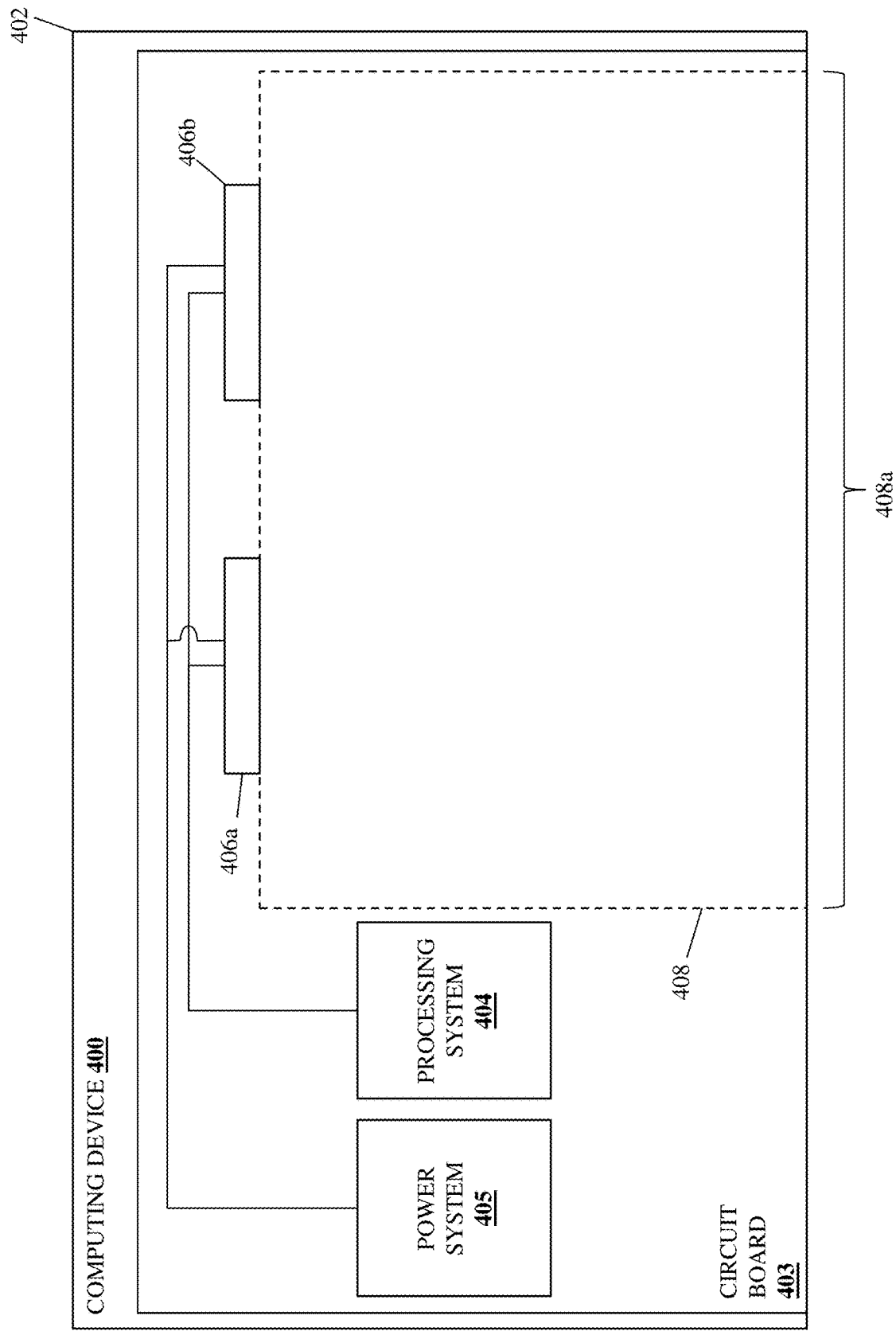

PMM/DC-MHS HPM INTERPOSER SYSTEM

BACKGROUND

The present disclosure relates generally to information handling systems, and more particularly to a Pluggable Multipurpose Module (PMM)/Data Center-Modular Hardware System Host Processor Module (DC-MHS HPM) interposer system for coupling a DC-MHS HPM to an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other computing devices known in the art, are configured to utilize a variety of hardware components in their operation, and efforts are ongoing to standardize those hardware components for better scalability and flexibility. The Open Compute Project (OCP) was founded to increase interoperability between datacenter, edge, and enterprise infrastructure by providing consistent interfaces and form factors for the modular building blocks that provide the hardware components used by server devices. For example, one sub-project/initiative of the OCP is the Data Center-Modular Hardware System (DC-MHS) that aims to standardize server hardware "blocks" by defining the form-factors and supporting components in a manner that allows their interoperability with different platforms used across the datacenter, edge, and enterprise infrastructure discussed above. However, the use of compute modules/blocks (e.g., "Host Processor Modules" (HPMs)) in server devices requires the provisioning of HPM slots in the chassis of the server devices and corresponding HPM connectors that are accessible via those HPM slots, utilizing valuable chassis space in the server devices and increasing the costs of server devices.

Accordingly, it would be desirable to provide a computing device DC-MHS HPM system that addresses the issues discussed above.

SUMMARY

According to one embodiment, an Information Handling System (IHS) includes a computing device; a Modular Hardware System Host Processor Module (DC-MHS HPM); and a Pluggable Multipurpose Module (PMM)/DC-MHS HPM interposer including: a DC-MHS HPM connector subsystem that is included on the interposer board and connected to the DC-MHS HPM; a PMM connector subsystem that is included on the interposer board and that is connected to the computing device; an interposer Baseboard Management Controller (BMC) that is included on the interposer board, coupled to the DC-MHS HPM connector subsystem, and configured to perform management operations on the DC-MHS HPM; a power controller that is included on the interposer board, coupled to the PMM connector subsystem, and cabled to the DC-MHS HPM; and a translation subsystem that is included on the interposer board, coupled to the DC-MHS HPM connector subsystem and the PMM connector subsystem, and configured to perform PMM/DC-MHS HPM translations on data transmitted between the DC-MHS HPM connector subsystem and the PMM connector subsystem.

BRIEF DESCRIPTION OF THE DRAWINGS

FIG. 4B is a schematic view illustrating an embodiment of a computing device that may be used with the DC-MHS HPM of FIG. 2B and the PMM/DC-MHS HPM interposer of FIG. 3B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
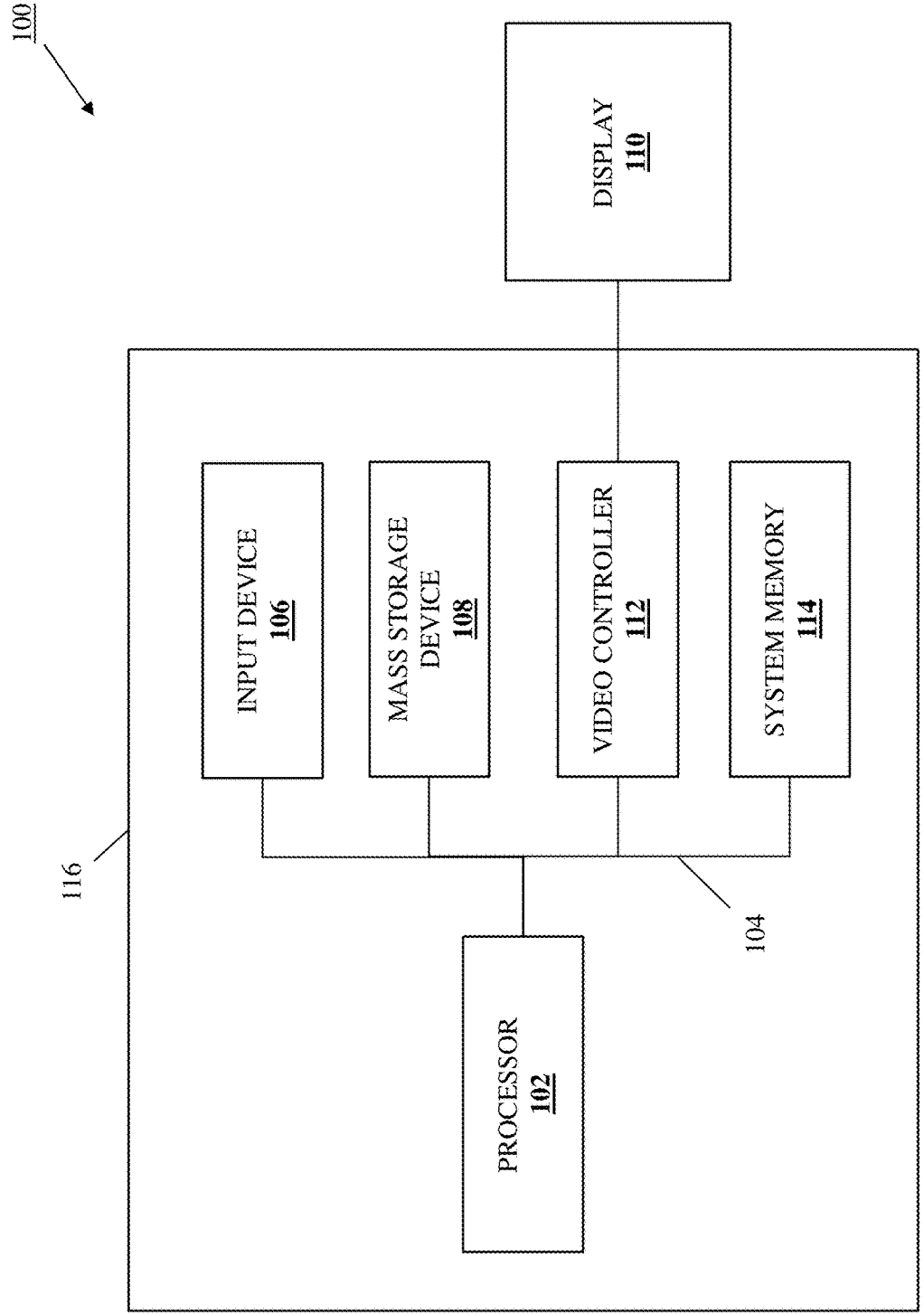
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
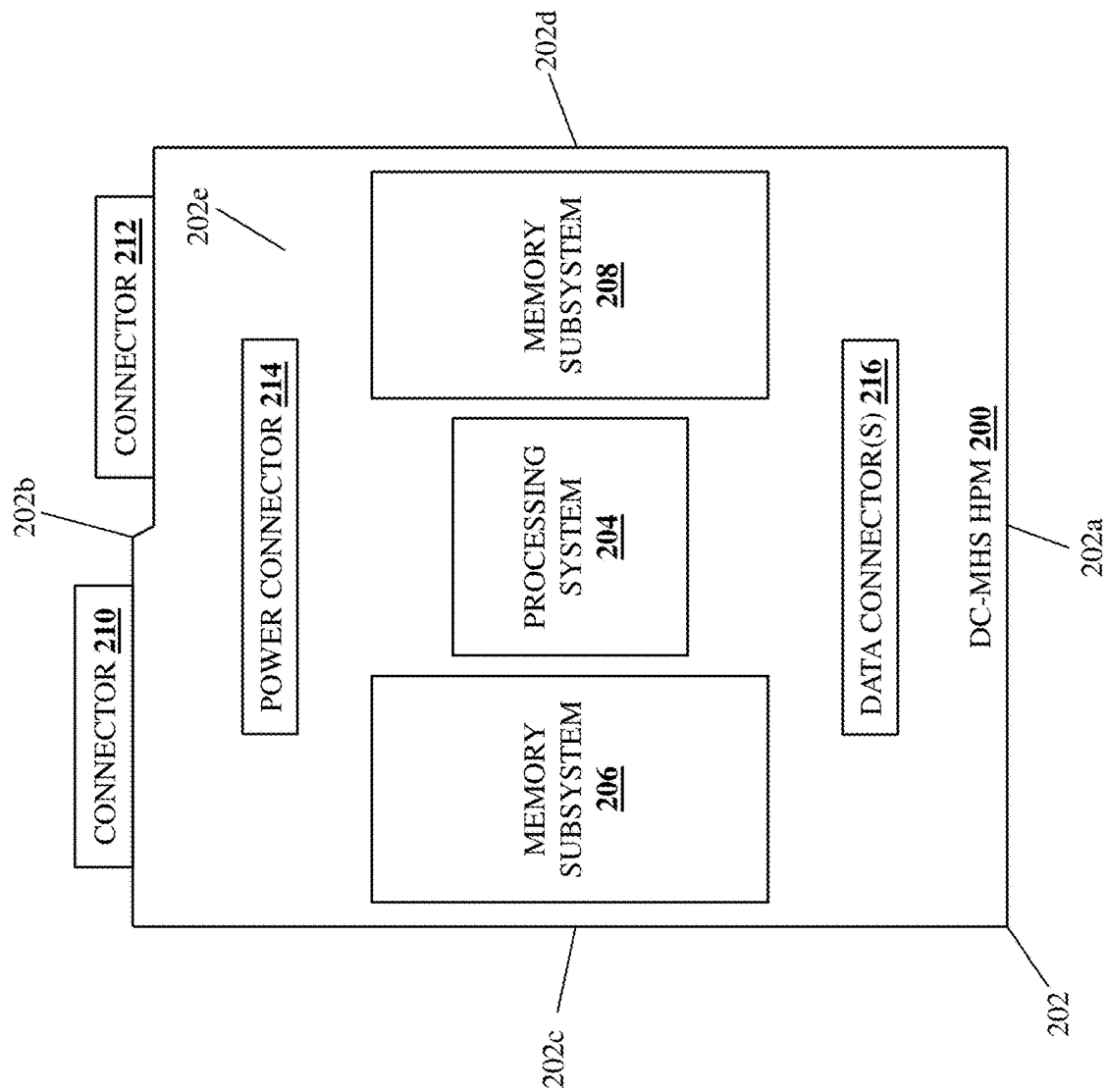
FIG. 2A is a schematic view illustrating an embodiment of a DC-MHS HPM provided according to the teachings of the present disclosure.

Referring now to FIG. 2A, an embodiment of a Data Center-Modular Hardware System Host Processor Module (DC-MHS HPM) 200 that may be provided according to the teachings of the present disclosure is illustrated. As will be appreciated by one of skill in the art in possession of the present disclosure, the DC-MHS HPM 200 may be provided in the IHS 100 discussed above with reference to FIG. 1 as a module hardware compute subsystem for the IHS 100 (e.g., with the DC-MHS HPM 200 providing the processor 102 and system memory 114 discussed above). However, while illustrated and discussed as being provided by a module hardware compute subsystem provided by a DC-MHS HPM, one of skill in the art in possession of the present disclosure will recognize that the functionality of the DC-MHS HPM 200 discussed below may be provided by other modular hardware subsystem that are configured to operate similarly as DC-MHS HPM 200 discussed below.

In the illustrated embodiment, the DC-MHS HPM 200 includes a chassis 202 (e.g., a circuit board, "card", and/or other chassis that would be apparent to one of skill in the art in possession of the present disclosure) that supports the components of the DC-MHS HPM 200, only some of which are illustrated and described below. The chassis 202 includes a front edge 202a, a rear edge 202b that is located opposite the chassis 202 from the front edge 202a, a pair of opposing side edges 202c and 202d that are located opposite the chassis 202 from each other and that extend between the front edge 202a and the rear edge 202b, and a top surface 202e that extends between the front edge 202a, the rear edge 202b, and the side edges 202c and 202d.

In the illustrated embodiment, the chassis 202 supports a processing system 204 (e.g., which may be similar to the processor 102 discussed above with reference to FIG. 1) that is mounted to the top surface 202e of the chassis 202 approximately midway between the side surfaces 202c and 202d, and a memory system that is mounted to the top surface 202e of the chassis 202 and that is provided by a plurality of memory subsystems 206 and 208 (e.g., which may be similar to the memory 114 discussed above with reference to FIG. 1) that are located on opposite sides of the processing system 204, coupled to processing system 204 (e.g., via traces in the circuit board that provides the chassis 202), and include instructions that, when executed by the processing system 204, cause the processing system 204 to provide an HPM engine that is configured to perform computing functionality of HPM engines, HPM subsystems, and/or DC-MHS HPMs that would be apparent to one of skill in the art in possession of the present disclosure.

As illustrated, the chassis 202 also includes a DC-MHS HPM connector subsystem that is coupled to the processing system 204 (e.g., via traces in the circuit board that provides the chassis 202) and provided by a pair of connectors 210 and 212 that are provided adjacent the rear edge 202b of the chassis 202. The chassis 202 also includes a power connector 214 that is mounted to the top surface 202e of the chassis 202 between the processing system 204 and the rear edge 202b of the chassis 202, and that may be configured (e.g., via traces in the circuit board that provides the chassis 202) to transmit power to any of the components included on the chassis 202.

The chassis 202 also includes one or more data connectors 216 that are mounted to the top surface 202e of the chassis 202 between the processing system 204 and the front edge 202a of the chassis 202, and that are coupled to processing system 204 (e.g., via traces in the circuit board that provides the chassis 202). As will be appreciated by one of skill in the art in possession of the present disclosure, the DC-MHS HPM 200 of FIG. 2 includes conventional DC-MHS HPM components provided by the processing system 204, the memory subsystems 206 and 208, and the connectors 210 and 212, while also having the power connector 214 and, in some embodiments, the data connector(s) 216 added to enable the functionality of the present disclosure described below. As such, one of skill in the art in possession of the present disclosure will appreciate how the data connector(s) 216 may be omitted in some embodiments while remaining within the scope of the present disclosure as well.

Figure 2B:
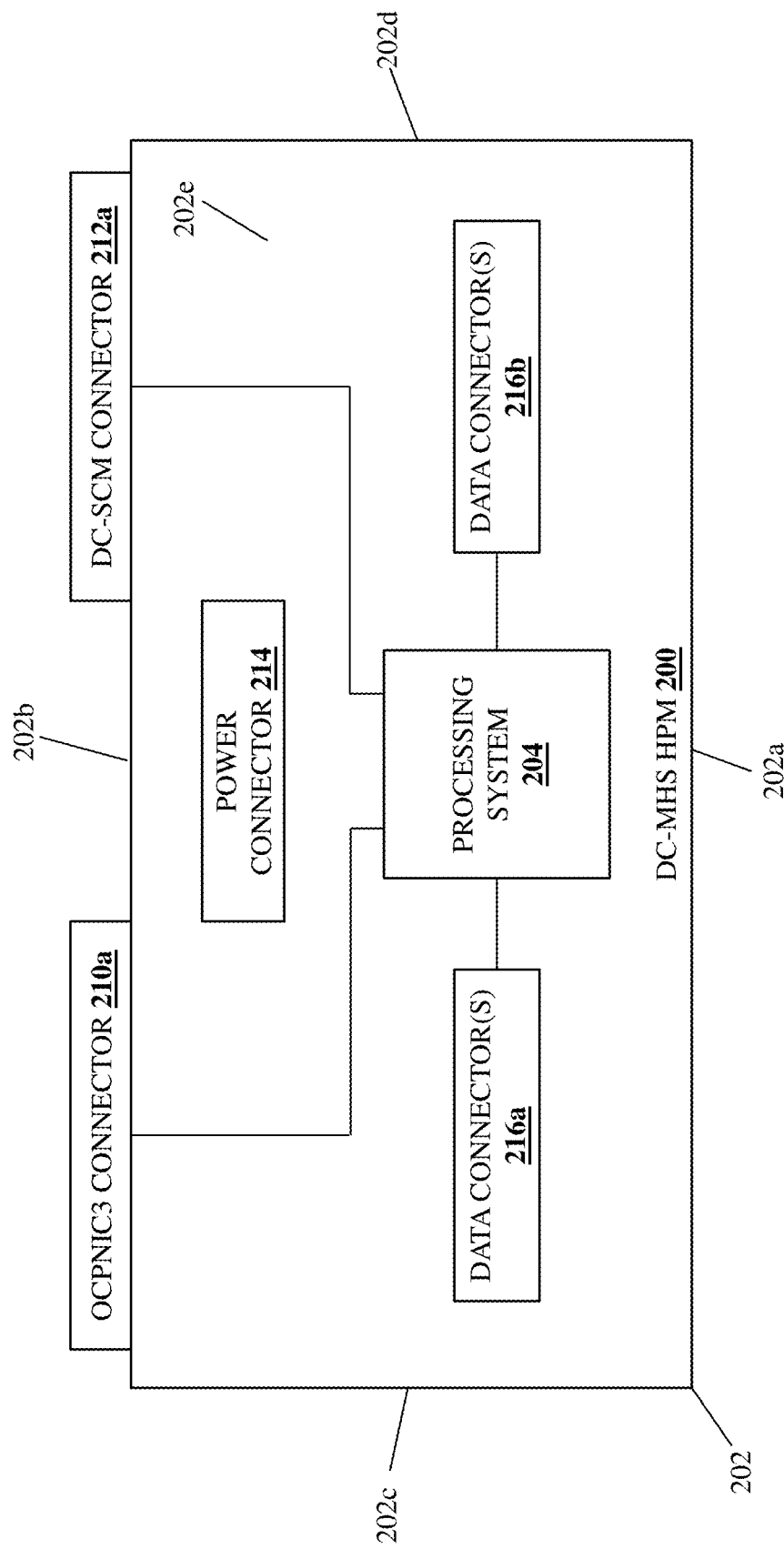
FIG. 2B is a schematic view illustrating an embodiment of the DC-MHS HPM of FIG. 2B.

With reference to FIG. 2B, a specific embodiment of the DC-MHS HPM 200 is illustrated for reference to some of the examples provided below. As illustrated, the DC-MHS HPM 200 of FIG. 2B includes one or more data connectors 216a that are coupled to the processing system 204 and that provide a first subset of the data connector(s) 216 of FIG. 2A, and one or more data connectors 216b that are coupled to the processing system 204 and that provide a second subset of the data connector(s) 216 of FIG. 2A. In the specific examples discussed below, the data connector(s) 216a are provided by a pair of 8-lane ("x8") data connectors, and the data connector(s) 216 are provided by a pair of 16-lane ("x16") data connectors, but one of skill in the art in possession of the present disclosure will appreciate how different size data connectors may be utilized while remaining within the scope of the present disclosure.

In the specific examples discussed below, the power connector 214 on the DC-MHS HPM 200 of FIG. 2B is provided by a Module hardware system-Platform Infrastructure Connectivity (M-PIC) connector (e.g., an M-PIC connector with two sets of 6 high current pins (e.g., a "2×6" power connection including 6 power pins and 6 ground pins) and an additional 12 side-band pins) provided according to the M-PIC specification, although one of skill in the art in possession of the present disclosure will appreciate how other power connectors will fall within the scope of the present disclosure as well. One of skill in the art in possession of the present disclosure will appreciate how the power connector 214 may be sized to transmit current at a level that safely powers the HPM 200, and the details of the power connector 214 may change based on the power requirements of the HPM 200.

As illustrated, the DC-MHS HPM 200 of FIG. 2B includes an "OCPNIC3" connector 210a (e.g., a female OCPNIC3 connector in the examples below) that is coupled to the processing system 204 and that provides the connector 210 of FIG. 2A, and a Data Center-Secure Control Module (DC-SCM) connector 212a (e.g., a female DC-SCM connector in the examples below) that is coupled to the processing system 204 and that provides the connector 212 of FIG. 2A. As will be appreciated by one of skill in the art in possession of the present disclosure, the OCPNIC3 connector 210a may be provided according to the Open Compute Project Network Interface Controller version 3.0 (OCPNIC3) specification, while the DC-SCM connector 212a may be provided according to the DC-SCM specification, although one of skill in the art in possession of the present disclosure will appreciate how other connectors will fall within the scope of the present disclosure as well.

To provide a specific example, the DC-MHS HPM 200 may be provided by a "class A" or "class B" DC-MHS HPM having a depth (i.e., as measured between the front edge 202a and the rear edge 202b and/or connectors 210/212/210a/212a) of up to 335 millimeters, and a width (i.e., as measured between the side edges 202c and 202d) between 210 millimeters and 250 millimeters, although other DC-MHS HPM dimensions are envisioned as falling within the scope of the present disclosure. In other words, the DC-MHS HPM 200 may be provided with a conventional DC-MHS HPM form-factor defined by DC-MHS HPM specification(s). However, while specific examples of DC-MHS HPMs that may be provided according to the teachings of the present disclosure have been illustrated and described, one of skill in the art in possession of the present disclosure will recognize that DC-MHS HPMs (or other devices operating according to the teachings of the present disclosure in a manner similar to that described below for the DC-MHS HPM 200) may include a variety of components and/or component configurations for providing conventional DC-MHS HPM functionality, as well as the PMM/DC-MHS HPM interposer functionality discussed below, while remaining within the scope of the present disclosure as well.

Figure 3A:
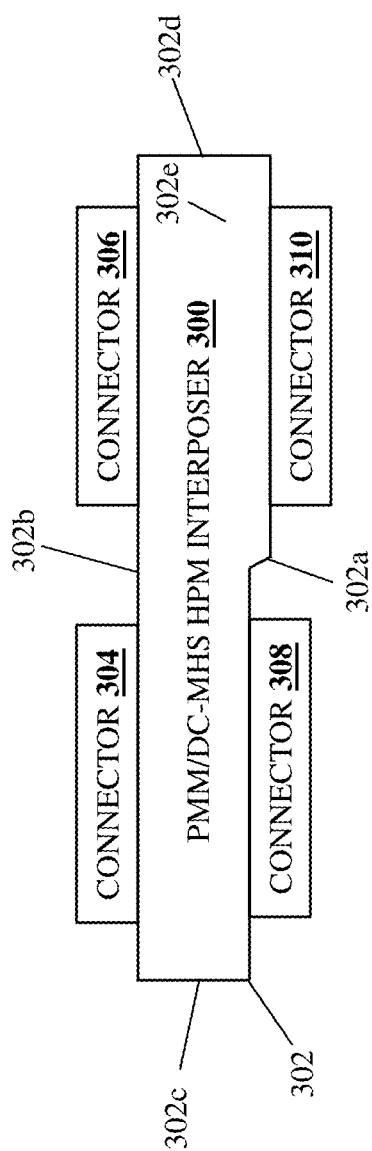
FIG. 3A is a schematic view illustrating an embodiment of a PMM/DC-MHS HPM interposer provided according to the teachings of the present disclosure.

Referring now to FIG. 3A, an embodiment of a PMM/DC-MHS HPM interposer 300 that may be provided according to the teachings of the present disclosure is illustrated. As discussed below, the PMM/DC-MHS HPM interposer 300 may be provided to couple DC-MHS HPMs to the IHS 100 discussed above with reference to FIG. 1 via a PMM connector subsystem included in that IHS 100. As will be appreciated by one of skill in the art in possession of the present disclosure, the inventors of the present disclosure have recognized a similarity between some DC-MHS HPM form factors and some PMM form-factors (e.g., the "class A" and "class B" DC-MHS HPM form factors discussed above are similar in depth and width to the PMM 2T.DW form factor), and have developed the PMM/DC-MHS HPM interposer 300 discussed below to allow the DC-MHS HPM 200 discussed above to be provided in a PMM slot defined by the chassis of a computing device and connected to a PMM connector subsystem that is accessible in the computing device via that PMM slot.) However, while illustrated and discussed as being used to couple a module hardware compute subsystem provided by a DC-MHS HPM to a computing device, one of skill in the art in possession of the present disclosure will recognize that the functionality of the PMM/DC-MHS HPM interposer 300 discussed below may be provided to couple other modular hardware subsystem to computing devices while remaining within the scope of the present disclosure as well.

In the illustrated embodiment, the PMM/DC-MHS HPM interposer 300 includes a chassis 302 (e.g., a circuit board and/or other chassis that would be apparent to one of skill in the art in possession of the present disclosure) that supports the components of the PMM/DC-MHS HPM interposer 300, only some of which are illustrated and described below. The chassis 302 includes a front edge 302a, a rear edge 302b that is located opposite the chassis 302 from the front edge 302a, a pair of opposing side edges 302c and 302d that are located opposite the chassis 302 from each other and that extend between the front edge 302a and the rear edge 302b, and a top surface 302e that extends between the front edge 302a, the rear edge 302b, and the side edges 302c and 302d.

In the illustrated embodiment, the chassis 202 includes a PMM connector subsystem that is provided by a pair of connectors 304 and 306 that are provided adjacent the rear edge 302b of the chassis 302, and a DC-MHS HPM connector subsystem that is provided by a pair of connectors 308 and 310 that are provided adjacent the front edge 302a of the chassis 302. To provide a specific example, the PMM/DC-MHS HPM interposer 300 may be provided with a depth (i.e., as measured between the front edge 302a and/or connectors 308/310, and the rear edge 302b and/or connectors 304/306) of approximately 45 millimeters, and a width (i.e., as measured between the side edges 302c and 302d) of approximately 250 millimeters, although other PMM/DC-MHS HPM interposer dimensions are envisioned as falling within the scope of the present disclosure.

Figure 3B:
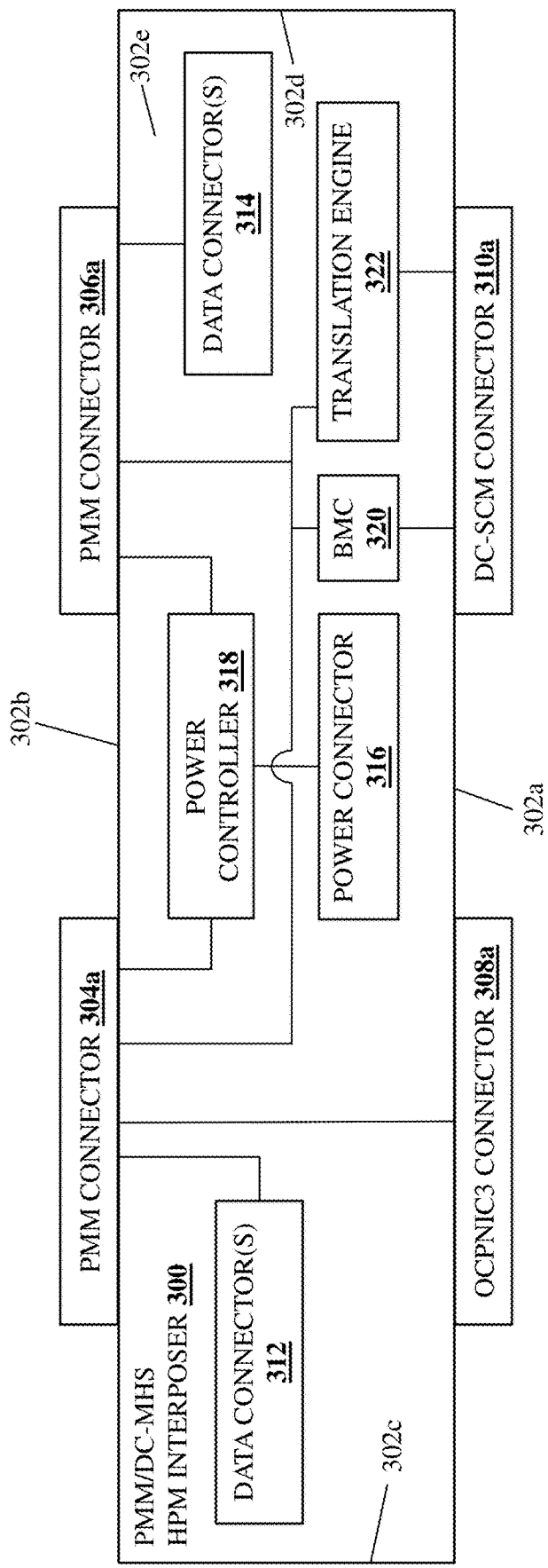
FIG. 3B is a schematic view illustrating an embodiment of the PMM/DC-MHS HPM interposer of FIG. 3B.

With reference to FIG. 3B, a specific embodiment of the PMM/DC-MHS HPM interposer 300 is illustrated for reference to some of the examples provided below. As illustrated, the PMM/DC-MHS HPM interposer 300 of FIG. 3B includes a PMM connector 304a that provides the connector 304 of FIG. 3A, and PMM connector 306a that provides the connector 306 of FIG. 3A. As will be appreciated by one of skill in the art in possession of the present disclosure, each of the PMM connectors 304a and 306a may be provided by a respective 32-lane ("x32") male ("gold finger") connector (e.g., a 4c++ connectors as defined in the PMM specification), although one of skill in the art in possession of the present disclosure will appreciate how other connectors will fall within the scope of the present disclosure as well.

The PMM/DC-MHS HPM interposer 300 of FIG. 3B also includes an "OCPNIC3" connector 308a (e.g., a 16-lane ("x16") male ("gold finger") OCPNIC3 connector in the specific examples provided below) that is coupled to the PMM connector 304a and that provides the connector 308 of FIG. 3A, and a DC-SCM connector 310a that provides the connector 310 of FIG. 3A. Similarly as discussed above, the OCPNIC3 connector 308a may be provided according to the OCPNIC3 specification (e.g., a 4c+ connector as defined in the DC-MHS OCP version 3.0 specification), while the DC-SCM connector 310a may be provided according to the DC-SCM specification (e.g., a 4c+ connector as defined in the SCM 2.0 specification), although one of skill in the art in possession of the present disclosure will appreciate how other connectors will fall within the scope of the present disclosure as well.

As illustrated, the PMM/DC-MHS HPM interposer 300 of FIG. 3B includes one or more data connectors 312 that are mounted to the top surface 302e of the chassis 302 and coupled to the PMM connector 304a, and one or more data connectors 314 that are mounted to the top surface 302e of the chassis 302 and coupled to the PMM connector 306a. In the specific examples discussed below, the data connector(s) 312 are provided by a pair of 8-lane ("x8") data connectors, and the data connector(s) 314 are provided by four 8-lane ("x8") data connectors, but one of skill in the art in possession of the present disclosure will appreciate how different size data connectors may be utilized while remaining within the scope of the present disclosure as well. Thus, in a specific example, the pair of x8 data connectors 312 and the x16 OCPNIC3 connector 308a may be coupled to the x32 PMM connector 304a, and the four x8 data connectors 314 may be coupled to the x32 PMM connector 306a.

The PMM/DC-MHS HPM interposer 300 of FIG. 3B also includes a power connector 316 that is mounted to the top surface 302e of the chassis 302. In the specific examples discussed below, the power connector 316 on the PMM/DC-MHS HPM interposer 300 of FIG. 2B is provided by an M-PIC connector (e.g., an M-PIC connector with two sets of 6 high current pins (e.g., a "2×6" power connection including 6 power pins and 6 ground pins) and an additional 12 side-band pins) provided according to the M-PIC specification, although one of skill in the art in possession of the present disclosure will appreciate how other power connectors will fall within the scope of the present disclosure as well. In a specific example, the power connector 316 may allow for the transmission of the maximum power available from the PMM connectors on the computing device discussed below, with the power connector 214 on the HPM 200 discussed above with reference to FIG. 2 configured based on the power requirements of the HPMP 200.

As can be seen, a power controller 318 is included on the top surface 302e of the chassis 302, coupled to each of the PMM connectors 304a and 306a, and coupled to the power connector 316, and as discussed below may be configured to transmit received from a computing device via the PMM connectors 304a and/or 304b to the power connector 316, convert power received from a computing device via the PMM connectors 304a and/or 304b prior to transmitting the converted power to the power connector 316 in some embodiments, perform PMM hot swap operations, and/or perform any other power controller functionality that would be apparent to one of skill in the art in possession of the present disclosure.

The PMM/DC-MHS HPM interposer 300 of FIG. 3B also includes a Baseboard Management Controller (BMC) 320 that is mounted to the top surface 302e of the chassis 302, coupled to each of the PMM connectors 304a and 306a, and coupled to the DC-SCM connector 310a, and as discussed below may be configured to perform management operations on a DC-MHS HPM, with a host BMC in a computing device, and/or in any other manner that would be apparent to one of skill in the art in possession of the present disclosure. As will be appreciated by one of skill in the art in possession of the present disclosure, the BMC 320 may be considered (or may include) a Data Center-Secure Control Module (DC-SCM) as defined by the OCP DC-SCM specification, or may otherwise be configured to perform DC-SCM functionality to manage the DC-MHS HPM 200 discussed above. Furthermore, the PMM/DC-MHS HPM interposer 300 of FIG. 3B also includes a processing subsystem (e.g., a Complex Programmable Logic Device (CPLD) or other logic/processing entity) that is configured to provide a translation engine 322 that is coupled to each of the PMM connectors 304a and 306a, and coupled to the DC-SCM connector 310a, and as discussed below may be configured to perform PMM/DC-MHS HPM translations on data transmitted between the DC-SCM connector 310a and the PMM connectors 304a and/or 306a, as well as other operations that one of skill in the art in possession of the present disclosure would recognize as enabling the functionality described below.

However, while specific examples of a PMM/DC-MHS HPM interposer that may be provided according to the teachings of the present disclosure have been illustrated and described, one of skill in the art in possession of the present disclosure will recognize that PMM/DC-MHS HPM interposers (or other devices operating according to the teachings of the present disclosure in a manner similar to that described below for the PMM/DC-MHS HPM interposer 300) may include a variety of components and/or component configurations for providing the PMM/DC-MHS HPM interposer functionality discussed below while remaining within the scope of the present disclosure as well.

Figure 4A:
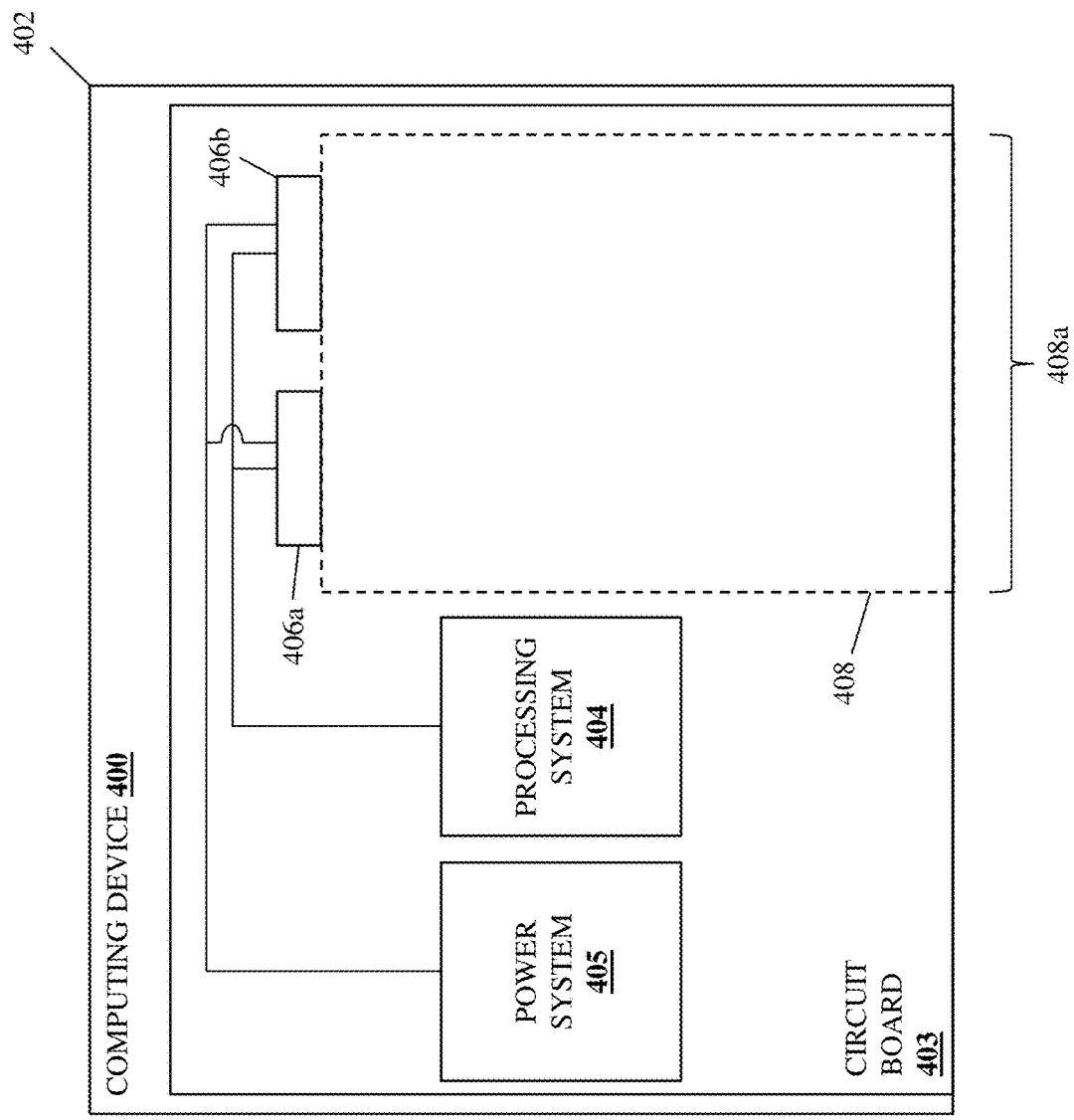
FIG. 4A is a schematic view illustrating an embodiment of a computing device that may be used with the DC-MHS HPM of FIG. 2A and the PMM/DC-MHS HPM interposer of FIG. 3A.

With reference to FIGS. 4A and 4B, a computing device 400 is illustrated that may be used with the DC-MHS HPM 200 discussed above with reference to FIGS. 2A and 2B, and the PMM/DC-MHS HPM interposer 300 discussed above with reference to FIGS. 3A and 3B. In an embodiment, the computing device 400 may be provided by the IHS 100 discussed above with reference to FIG. 1, may include some or all of the components of the IHS 100, and in specific examples may be provided by a server device. However, while described as being provided by a server device, one of skill in the art in possession of the present disclosure will appreciate how the computing device 400 may be provided by other computing devices while remaining within the scope of the present disclosure as well. In the Illustrated embodiment, the computing device 400 includes a chassis 402 that houses the components of the computing device 300, only some of which are illustrated and described below.

In the examples provided below, the chassis 402 houses a circuit board 403 (e.g., a motherboard) that supports the components of the computing device 400. In the illustrated example, a processing system 404 is mounted to the circuit board 403, and may be provided by the processor 102 discussed above with reference to FIG. 1 (e.g., a Central Processing Unit (CPU)), a processor included in a BMC provided with the computing device 400 (also referred to as a "host BMC" below), and/or any other processing system components that would be apparent to one of skill in the art in possession of the present disclosure. Furthermore, a power system 405 may be mounted and/or coupled to the circuit board 403, and may be provided by any of a variety power components (e.g., Power Supply Units (PSUs), power controllers, etc.) that would be apparent to one of skill in the art in possession of the present disclosure. Further still, a plurality of PMM connectors 406a and 406b are mounted to the circuit board 403 and coupled to the processing system 404 and the power system 405 (e.g., via traces in the circuit board 403), and in the specific examples below are each provided by a respective 32-lane ("x32") female connector, although one of skill in the art in possession of the present disclosure will appreciate how other connectors will fall within the scope of the present disclosure as well.

As illustrated, the chassis 403 may defined a DC-MHS HPM housing 408 adjacent the PMM connectors 406a and 406b, and a DC-MHS HPM housing entrance 408a may be defined on a surface of the chassis 403 such that a DC-MHS HPM may be moved through the DC-MHS HPM housing entrance 408a and into the DC-MHS HPM housing 408 as described below. As will be appreciated by one of skill in the art in possession of the present disclosure, the DC-MHS HPM housing 408 and DC-MHS HPM housing entrance 408a may be provided by a PMM housing and PMM housing entrance that is configured to receive one of more types of PMM devices, and may be used as the DC-MHS HPM housing 408 and DC-MHS HPM housing entrance 408a with the DC-MHS HPM 200 that is dimensioned similarly to those type(s) of PMM devices. However, while a specific computing device 400 has been illustrated and described, one of skill in the art in possession of the present disclosure will recognize that computing devices (or other devices operating according to the teachings of the present disclosure in a manner similar to that described below for the computing device 400) may include a variety of components and/or component configurations for providing conventional computing device functionality, as well as the PMM/DC-MHS HPM interposer functionality discussed below, while remaining within the scope of the present disclosure as well.

Figure 5:
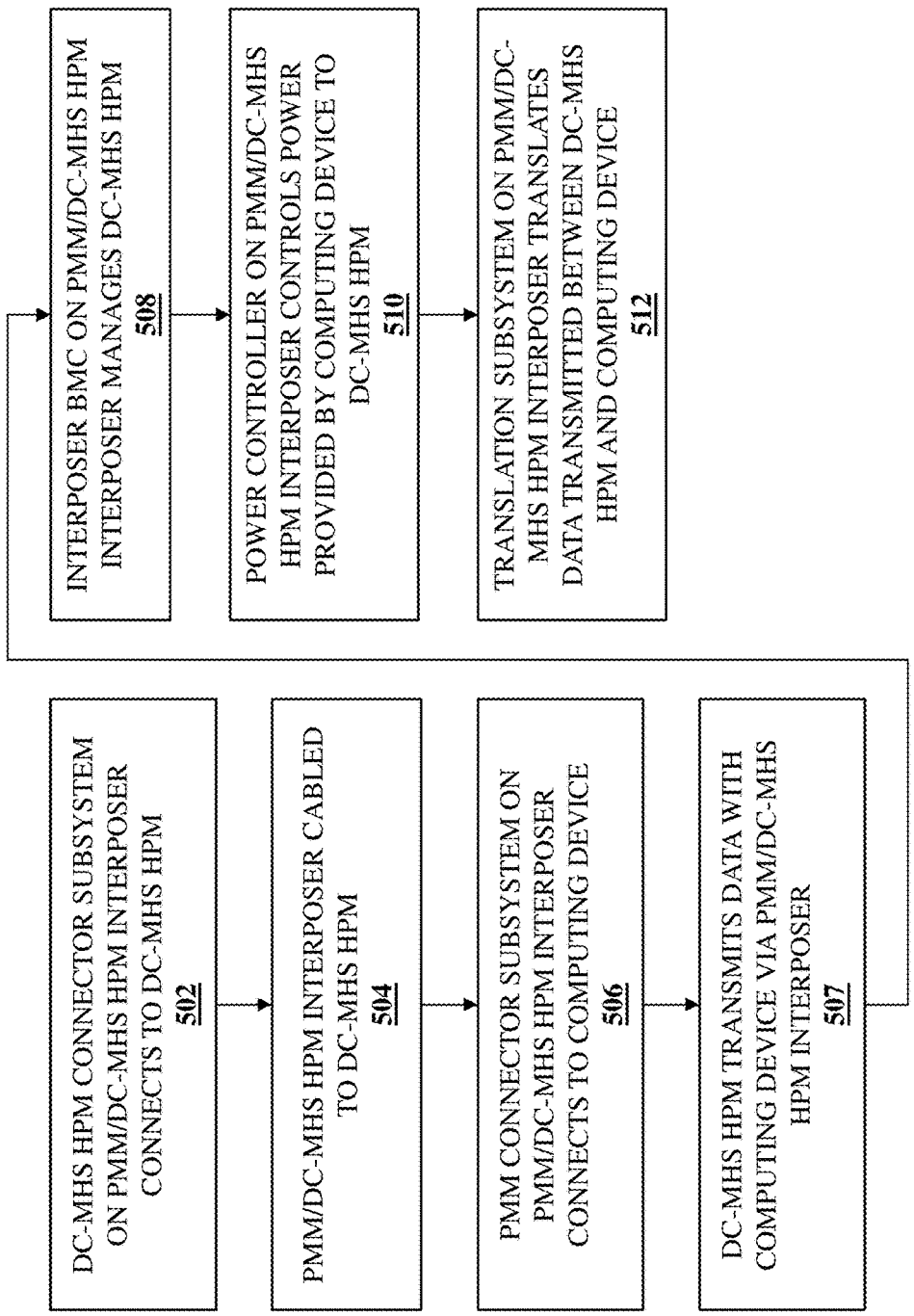
FIG. 5 is a flow chart illustrating an embodiment of a method for connecting a DC-MHS HPM to a PMM connector subsystem on a computing device using a PMM/DC-MHS HPM interposer.

Referring now to FIG. 5, an embodiment of a method 500 for connecting a Data Center-Modular Hardware System Host Processor Module (DC-MHS HPM) to a Pluggable Multipurpose Module (PMM) connector subsystem on a computing device using a PMM/DC-MHS HPM interposer is illustrated. As discussed below, the systems and methods of the present disclosure provide a PMM/DC-MHS HPM interposer that enables the coupling of a DC-MHS HPM to a computing device via a PMM connector subsystem on the computing device. For example, the PMM/DC-MHS HPM interposer of the present disclosure may include an interposer board having a DC-MHS HPM connector subsystem that connects to a DC-MHS HPM, and a PMM connector subsystem that connects to a computing device. An interposer BMC on the interposer board is coupled to the DC-MHS HPM connector subsystem and configured to perform management operations on a DC-MHS HPM connected to the DC-MHS HPM connector subsystem. A power controller on the interposer board is coupled to the PMM connector subsystem and configured to be cabled to a DC-MHS HPM connected to the DC-MHS HPM connector subsystem. A translation subsystem on the interposer board is coupled to the DC-MHS HPM connector subsystem and the PMM connector subsystem and configured to perform PMM/DC-MHS HPM translations on data transmitted between the DC-MHS HPM connector subsystem and the PMM connector subsystem. As such, DC-MHS HPMs may be utilized with computing devices that do not include dedicated DC-MHS HPM chassis slots/connector subsystems (e.g., via the PMM chassis slots/connectors subsystem on the computing devices as described below).

Figure 6A:
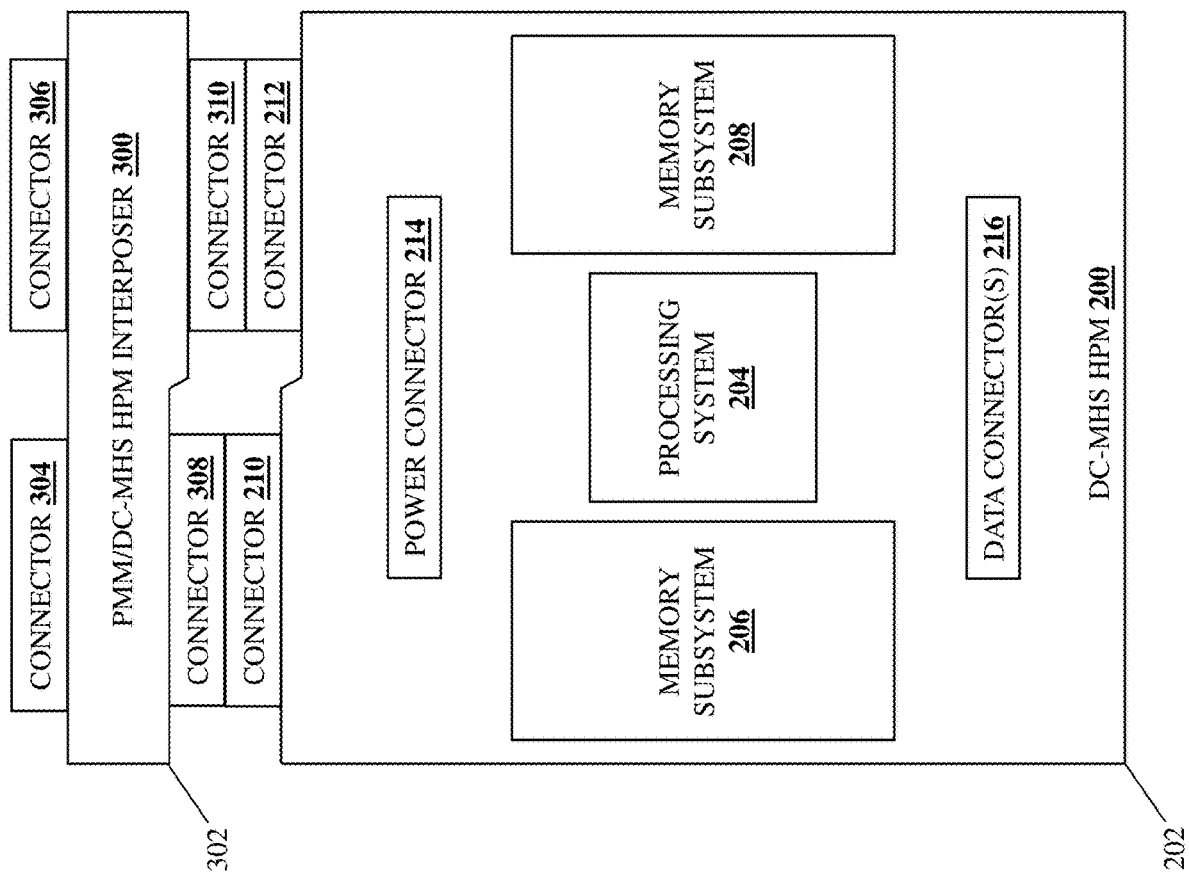
FIG. 6A is a schematic view illustrating an embodiment of the DC-MHS HPM of FIG. 2A connected to the PMM/DC-MHS HPM interposer of FIG. 3A during the method of FIG. 5.
Figure 6B:
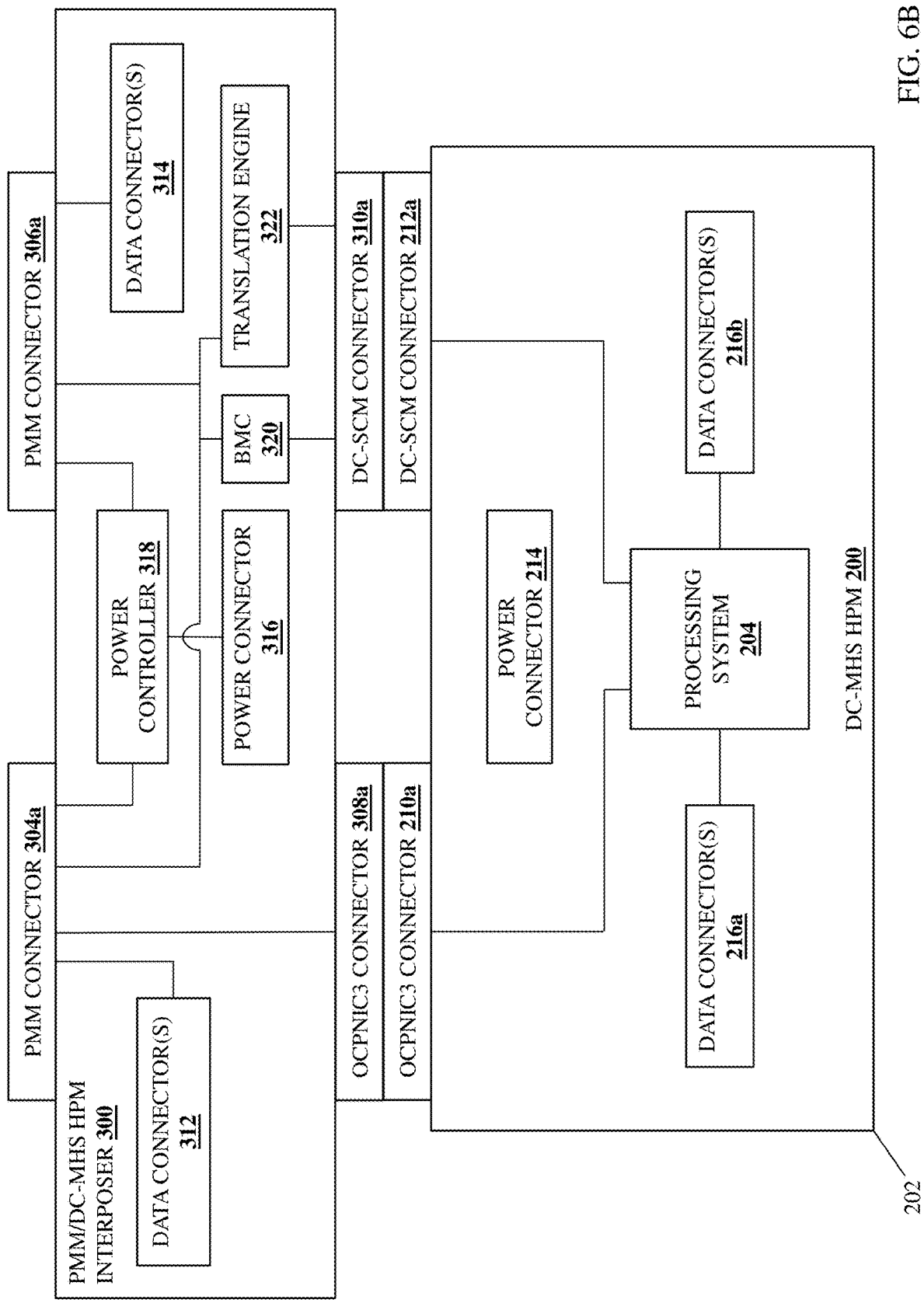
FIG. 6B is a schematic view illustrating an embodiment of the DC-MHS HPM of FIG. 2B connected to the PMM/DC-MHS HPM interposer of FIG. 3B during the method of FIG. 5.

The method 500 begins at block 502 where a DC-MHS HPM connector subsystem on a PMM/DC-MHS HPM interposer connects to a DC-MHS HPM. With reference to FIG. 6A, in an embodiment of block 502, the DC-MHS HPM 200 may be positioned adjacent the PMM/DC-MHS HPM interposer 300 such that the connectors 210 and 212 on the DC-MHS HPM 200 are aligned with the connectors 308 and 310, respectively, on the PMM/DC-MHS HPM interposer 300. The DC-MHS HPM 200 may then be moved towards the PMM/DC-MHS HPM interposer 300 such that the connectors 210 and 212 on the DC-MHS HPM 200 connect with the connectors 308 and 310, respectively, on the PMM/DC-MHS HPM interposer 300. As such, and as can be seen in FIG. 6B, at block 502 the OCPNIC3 connector 210a and the DC-SCM connector 212a on the DC-MHS HPM 200 may connect to the OCPNIC3 connector 308a and the DC-SCM connector 310a on the PMM/DC-MHS HPM interposer 300.

Figure 7A:
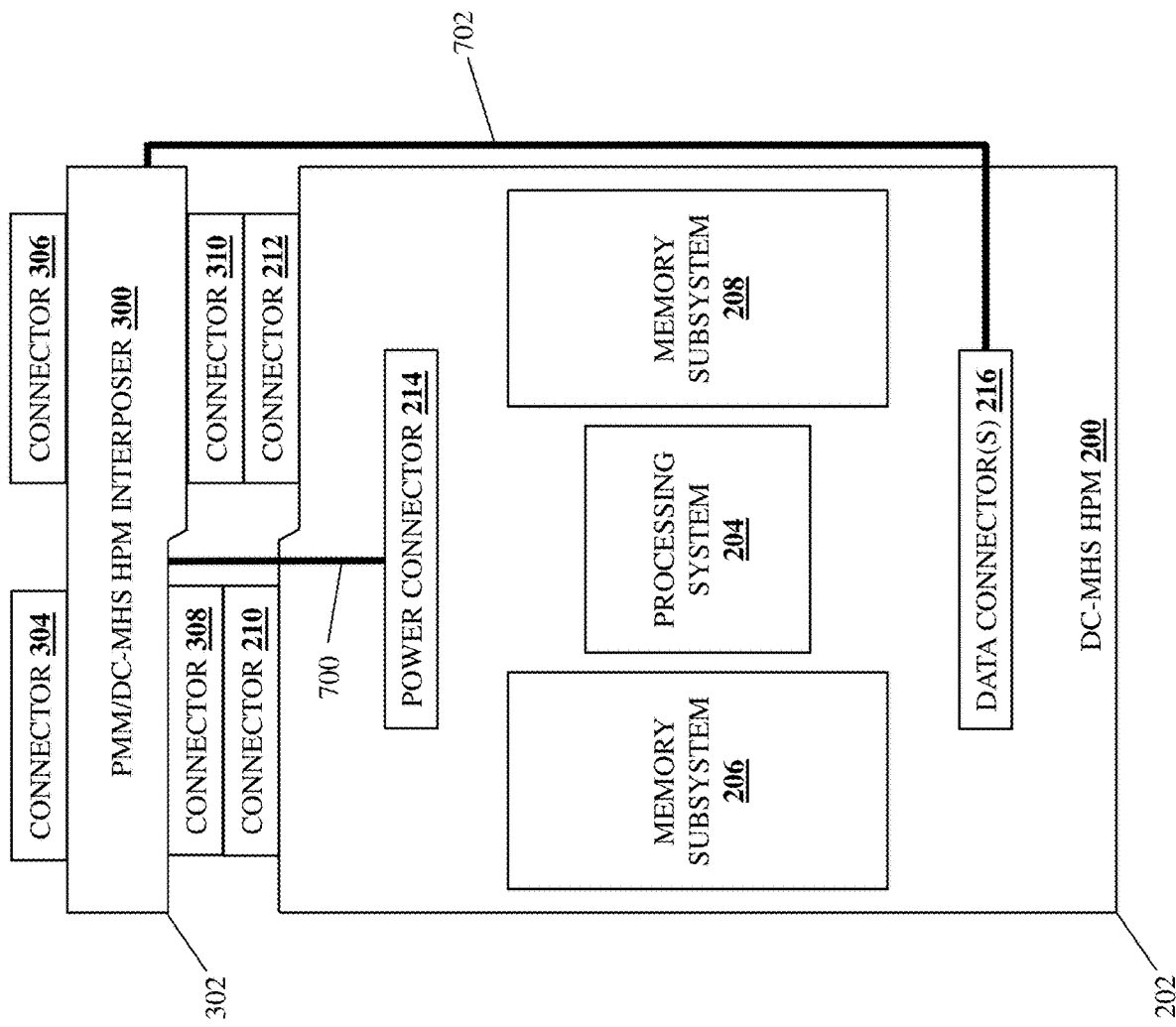
FIG. 7A is a schematic view illustrating an embodiment of the DC-MHS HPM of FIG. 2A cabled to the PMM/DC-MHS HPM interposer of FIG. 3A during the method of FIG. 5.
Figure 7B:
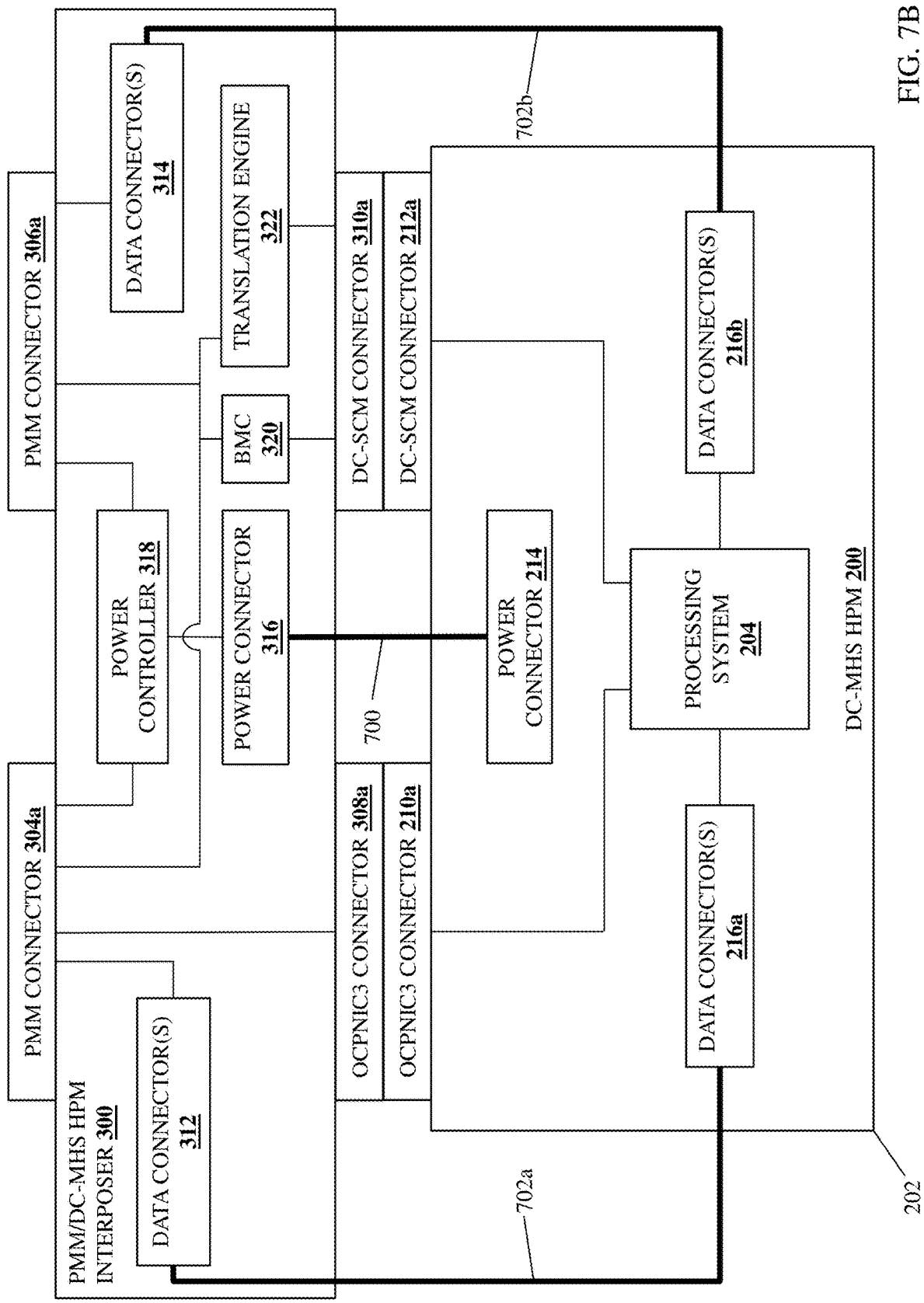
FIG. 7B is a schematic view illustrating an embodiment of the DC-MHS HPM of FIG. 2B cabled to the PMM/DC-MHS HPM interposer of FIG. 3B during the method of FIG. 5.

The method 500 then proceeds to block 504 where the PMM/DC-MHS HPM interposer is cabled to the DC-MHS HPM. With reference to FIG. 7A, in an embodiment of block 504, a power cable 700 may be used to cable the PMM/DC-MHS HPM interposer 300 to the power connector 214 on the DC-MHS HPM 200. As such, and as can be seen in FIG. 7B, at block 504 the power cable 700 may be used to cable the power connector 214 on the DC-MHS HPM 200 to the power connector 316 on the PMM/DC-MHS HPM interposer 300. With reference back to FIG. 7A, in some embodiments of block 504, a respective data cable 702 may be used to cable the PMM/DC-MHS HPM interposer 300 one or more of the data connector(s) 216 on the DC-MHS HPM 200.

As such, and as can be seen in FIG. 7B, at block 504 respective data cables 702a may be used to cable any of the data connector(s) 216a on the PMM/DC-MHS HPM interposer 300 to corresponding data connector(s) 312 on the DC-MHS HPM 200 (e.g., a pair of data cables 702a may connect the pair of x8 data connectors 216a to the pair of x8 data connectors 312), and respective data cables 702b may be used to cable any of the data connector(s) 216b on the PMM/DC-MHS HPM interposer 300 to corresponding data connector(s) 314 on the DC-MHS HPM 200 (e.g., four data cables 702b may connect the four x8 data connectors 216b to the four x8 data connectors 314). As will be appreciated by one of skill in the art in possession of the present disclosure, the number of data cables used to connect data connectors on the DC-MHS HPM 200 and the PMM/DC-MHS HPM interposer 300 will depend on the data transmission requirements of the DC-MHS HPM 200 for any particular application, and some embodiments may not require the connection of any data connectors on the DC-MHS HPM 200 and the PMM/DC-MHS HPM interposer 300 (i.e., the data connection provided by the OCPNIC3 connector 308a and the PMM connector 304a on the PMM/DC-MHS HPM interposer 300 may be sufficient to satisfy the data transmission requirements of the DC-MHS HPM 200.

Figure 8A:
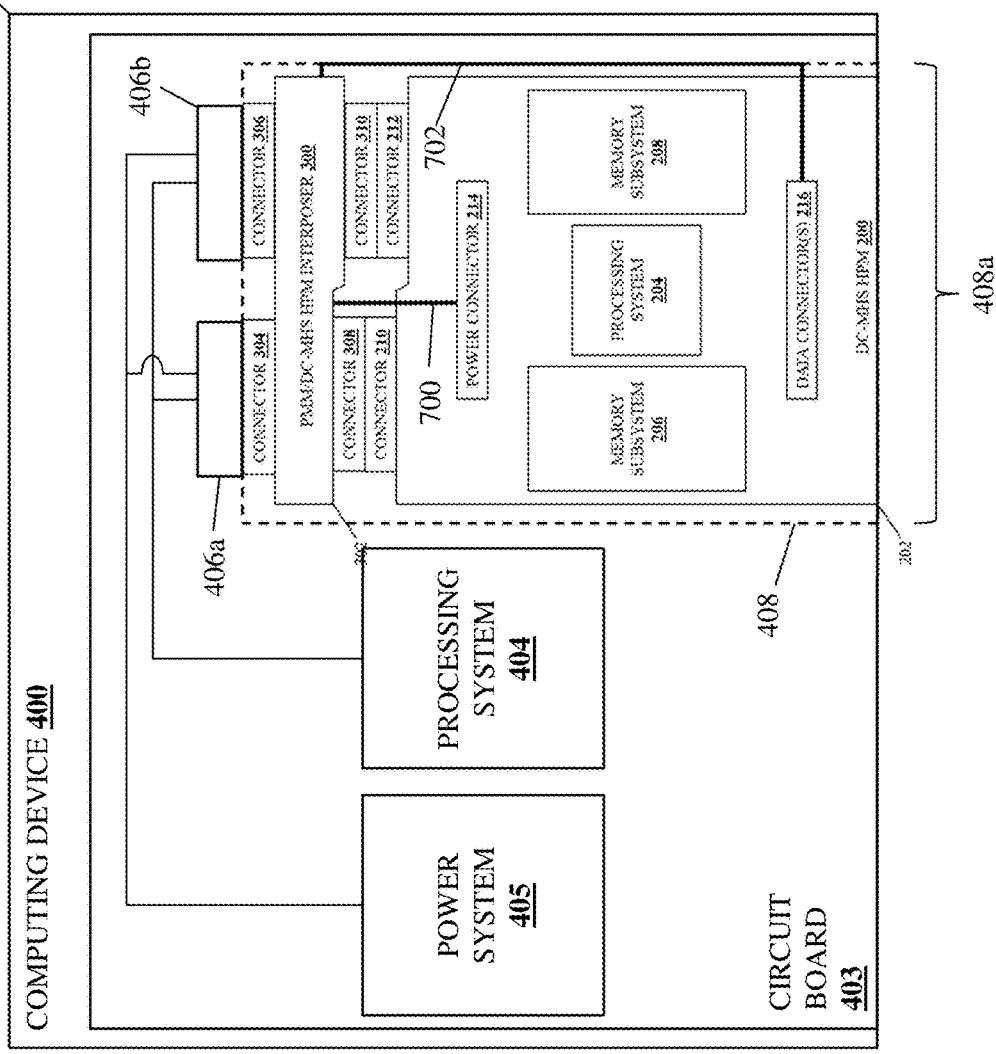
FIG. 8A is a schematic view illustrating an embodiment of the DC-MHS HPM and PMM/DC-MHS HPM interposer of FIG. 7A connected to the computing device of FIG. 4A during the method of FIG. 5.
Figure 8B:
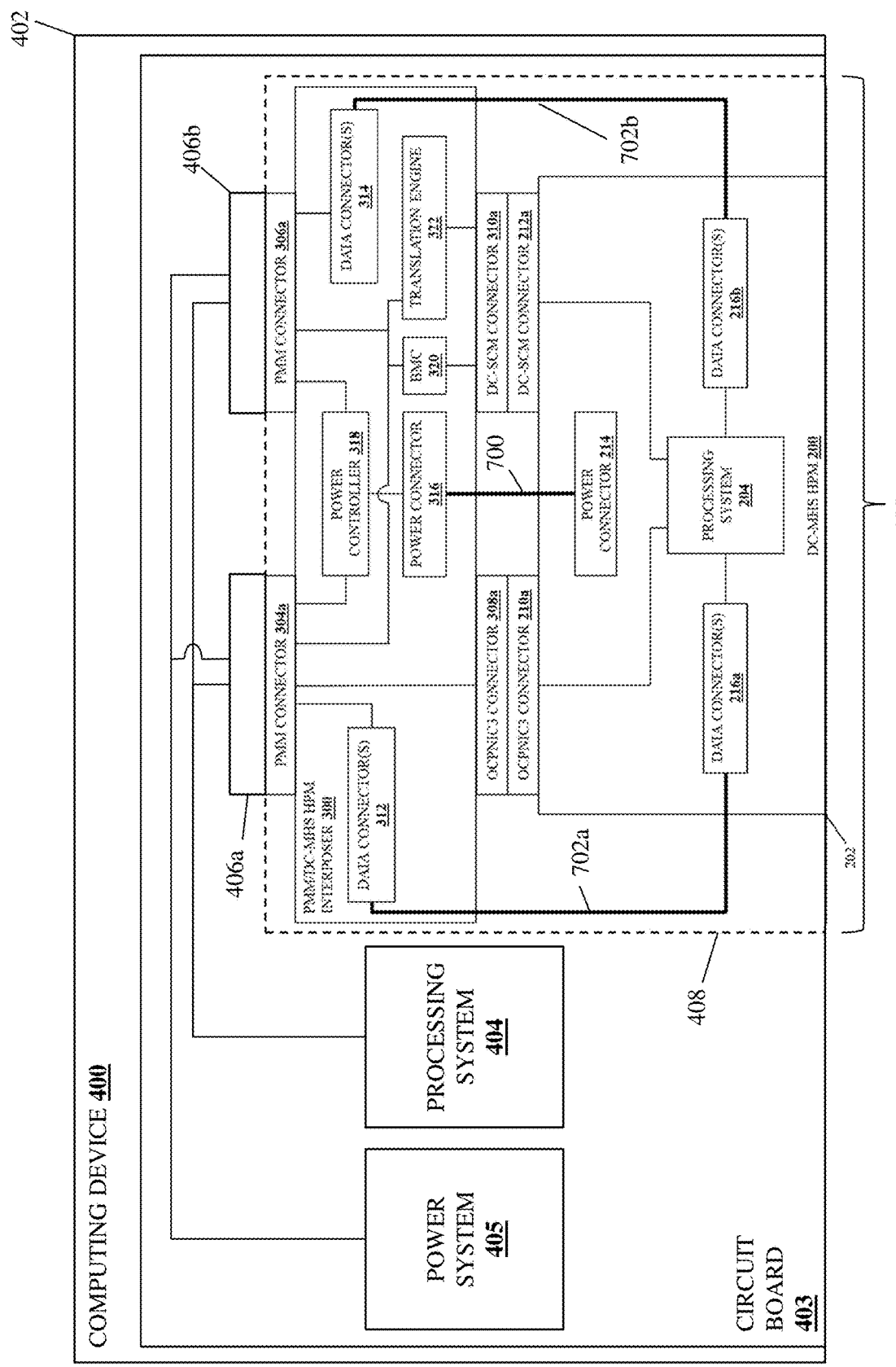
FIG. 8B is a schematic view illustrating an embodiment of the DC-MHS HPM and PMM/DC-MHS HPM interposer of FIG. 7B connected to the computing device of FIG. 4B during the method of FIG. 5.

The method 500 then proceeds to block 506 where a PMM connector subsystem on the PMM/DC-MHS HPM interposer is connected to a computing device. With reference to FIG. 8A, in an embodiment of block 506, the connected and cabled DC-MHS HPM 200 and PMM/DC-MHS HPM interposer 300 discussed above with reference to FIG. 7A may be positioned adjacent the DC-MHS HPM housing entrance 408a on the computing device 400 such that the connectors 304 and 306 on the PMM/DC-MHS HPM interposer 300 are located adjacent the DC-MHS HPM housing entrance 408a. The connected and cabled DC-MHS HPM 200 and PMM/DC-MHS HPM interposer 300 may then be moved towards the computing device 400 such that it moves through the DC-MHS HPM housing entrance 408a and into the DC-MHS HPM housing 408, and one of skill in the art in possession of the present disclosure will appreciate how continued movement of the connected and cabled DC-MHS HPM 200 and PMM/DC-MHS HPM interposer 300 through the DC-MHS HPM housing 408 will cause the connectors 304 and 306 on the PMM/DC-MHS HPM interposer 300 to engage the PMM connectors 406a and 406b, respectively, on the computing device 400 (i.e., once the connected and cabled DC-MHS HPM 200 and PMM/DC-MHS HPM interposer 300 are positioned in the DC-MHS HPM housing 408 as can be seen in FIG. 8A). As such, and as can be seen in FIG. 8B, at block 506 the PMM connectors 304a and 306a on the PMM/DC-MHS HPM interposer 300 may be connected to the PMM connectors 406a and 406b, respectively, on the computing device 400.

Figure 9:
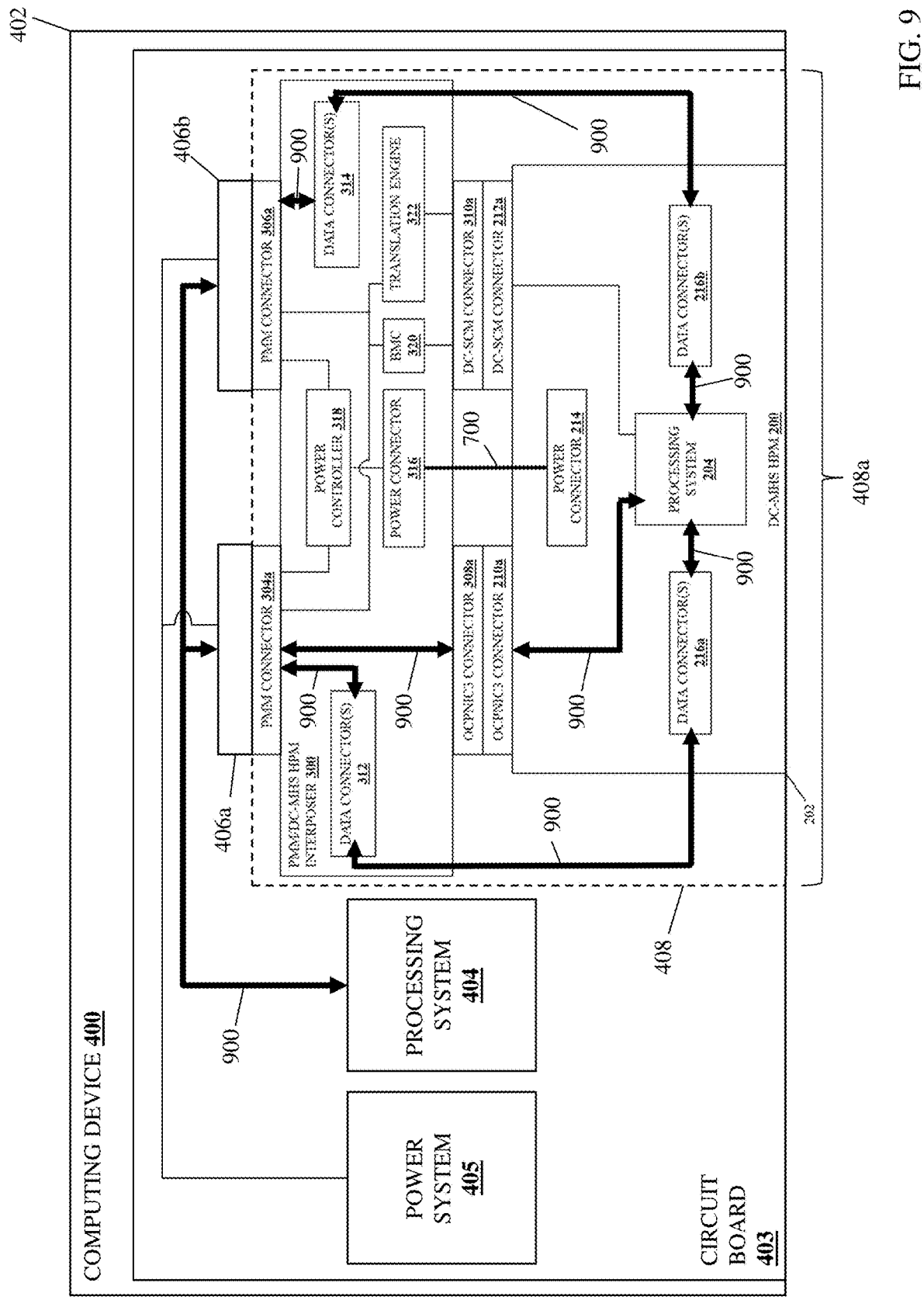
FIG. 9 is a schematic view illustrating an embodiment of the DC-MHS HPM, PMM/DC-MHS HPM interposer, and computing device of FIG. 8B operating during the method of FIG. 5.

The method 500 then proceeds to block 507 where the DC-MHS HPM transmits data with the computing device via the PMM/DC-MHS HPM interposer. With reference to FIG. 9, in an embodiment of block 507, the processing system 404 in the computing device 400 and the processing system 204 in the DC-MHS HPM 200 may perform data transmission operations 900. As can be seen in FIG. 9, in some embodiments the data transmission operations 900 may include the transmission of data by the processing systems 204 and 404 via the PMM connectors 304a/406a and the OCPNIC3 connectors 210a/308a. Furthermore, in some embodiments the data transmission operations 900 may include the transmission of data by the processing systems 204 and 404 via the PMM connectors 304a/406a, the data connector(s) 312, the data cable(s) 702a, and the data connector(s) 216a. Further still, in some embodiments the data transmission operations 900 may include the transmission of data by the processing systems 204 and 404 via the PMM connectors 306a/406b, the data connector(s) 314, the data cable(s) 702b, and the data connector(s) 216b. As such, one of skill in the art in possession of the present disclosure will appreciate how the data connectors 216a and 216b on the DC-MHS HPM 200 and the data connectors 312 and 314 on the PMM/DC-MHS HPM interposer 300 enable the scaling of the data transmission bandwidth between the DCMHS HPM 200 and the computing device 400.

Figure 10:
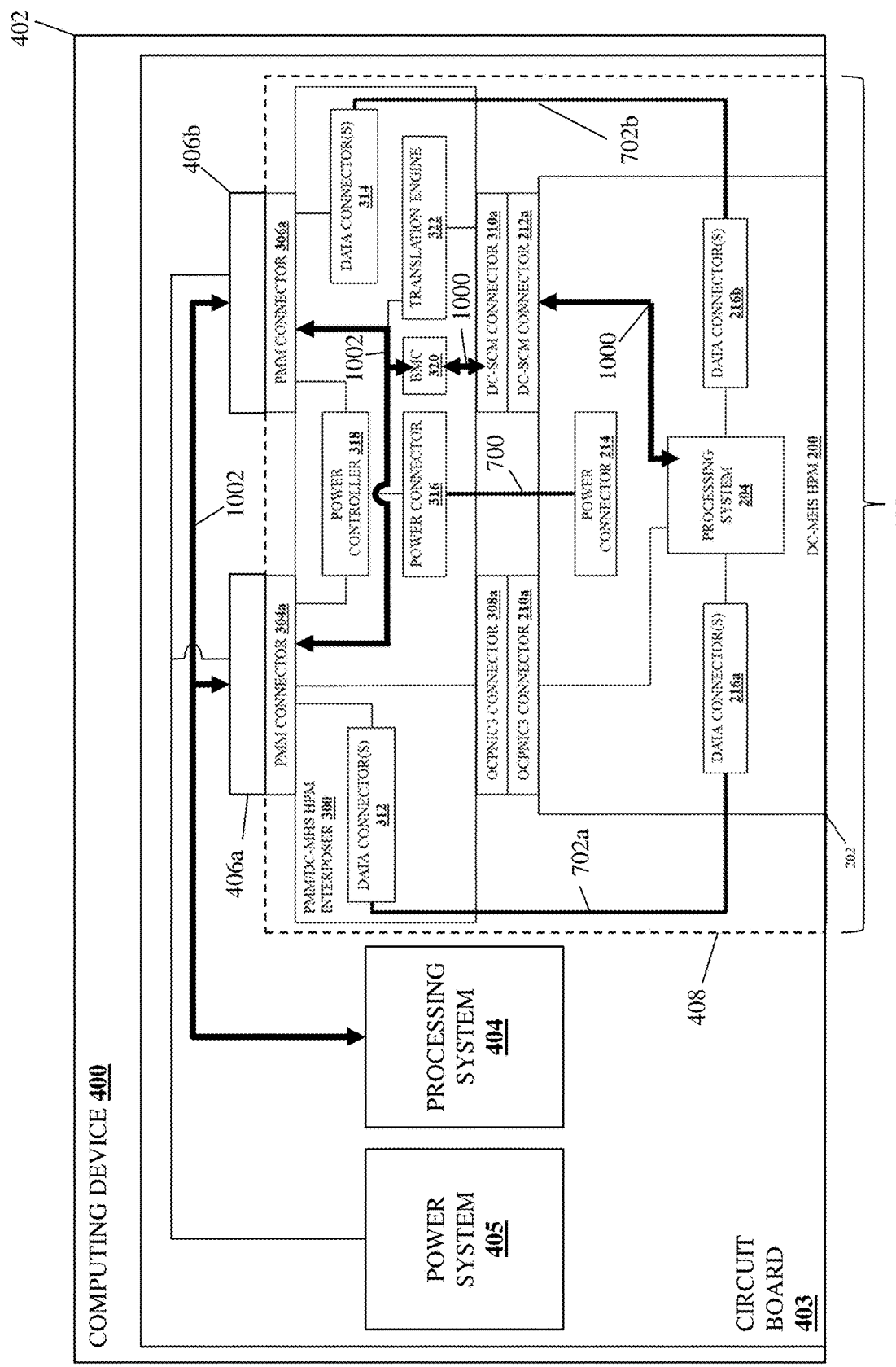
FIG. 10 is a schematic view illustrating an embodiment of the DC-MHS HPM, PMM/DC-MHS HPM interposer, and computing device of FIG. 8B operating during the method of FIG. 5.

The method 500 then proceeds to block 508 where an interposer BMC on the PMM/DC-MHS HPM interposer manages the DC-MHS HPM. With reference to FIG. 10, in an embodiment of block 508, the BMC 320 in the PMM/DC-MHS HPM interposer 300 may perform DC-MHS HPM management operations 1000 with the DC-MHS HPM 200 that may include the transmission of data between the BMC 320 in the PMM/DC-MHS HPM interposer 300 and the processing system 204 in the DC-MHS HPM 200 via the DC-SCM connectors 310a and 212a, respectively, and may include any of a variety of baseboard management operations (or DC-SCM operations) that would be apparent to one of skill in the art in possession of the present disclosure on any of the components included on the DC-MHS HPM 200. Furthermore, while the DC-MHS HPM management operations 1000 are illustrated as being performed with the processing system 204 in the DC-MHS HPM 200 in the simplified example illustrated in FIG. 10, one of skill in the art in possession of the present disclosure will appreciate how the DC-MHS HPM management operations 1000 may be performed with any of the components included on the DC-MHS HPM 200 while remaining within the scope of the present disclosure as well.

With continued reference to FIG. 10, in an embodiment of block 508, the BMC 320 in the PMM/DC-MHS HPM interposer 300 may perform computing device management operations 1002 with the computing device 400 that may include the transmission of data between the BMC 320 in the PMM/DC-MHS HPM interposer 300 and the processing system 404 in the computing device 400 via the PMM connectors 304a/306a and the PMM connectors 406a/406b, respectively, and may include any of a variety of management coordination operations that one of skill in the art in possession of the present disclosure will recognize may be performed with a host BMC provided by the processing system 404 in the computing device 400. For example, the computing device management operations 1002 may include the host BMC instructing the BMC 320 to perform management operations on the DC-MHS HPM 200, the host BMC and the BMC 320 offloading management operations from each other, and/or any of a variety of multi-BMC management operations that would be apparent to one of skill in the art in possession of the present disclosure. However, while a few specific examples have been provided, one of skill in the art in possession of the present disclosure will appreciate how the BMC 320 may operate to manage the DC-MHS HPM in a variety of manners that will fall within the scope of the present disclosure as well.

Figure 11:
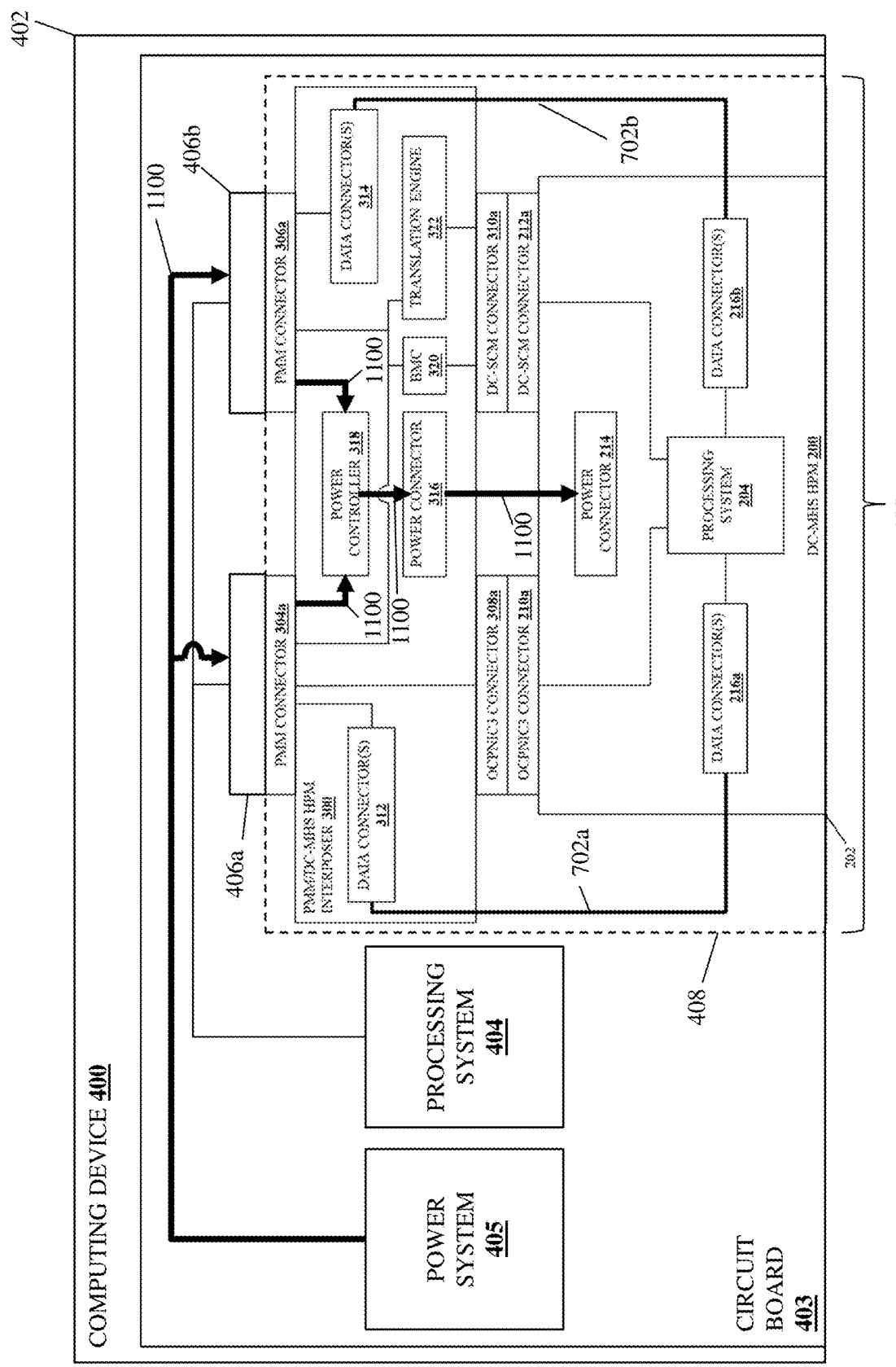
FIG. 11 is a schematic view illustrating an embodiment of the DC-MHS HPM, PMM/DC-MHS HPM interposer, and computing device of FIG. 8B operating during the method of FIG. 5.

The method 500 then proceeds to block 510 where a power controller on the PMM/DC-MHS HPM interposer controls power provided by the computing device to the DC-MHS HPM. With reference to FIG. 11, in an embodiment of block 510, the power controller 318 in the PMM/DC-MHS HPM interposer 300 may perform power control operations 1100 that may include receiving power from the power system 405 in the computing device 400 via the PMM connectors 304a/306a and the PMM connectors 406a/406b, respectively, and transmitting that power via the power connector 316 on the PMM/DC-MHS HPM interposer 300, over the power cable 700, and to the power connector 214 on the DC-MHS HPM 200 for use in powering the components of the DC-MHS HPM 200. In a specific example, the power control operations 1100 may include the power controller 318 performing power conversion operations such as receiving 48 volt power from the computing device 400 and converting that 48 volt power to 12 volt power that is provided to the DC-MHS HPM 200, although embodiments in which the power received from the computing device 400 (e.g. 12 volts) is provided by the power controller 318 to the DC-MHS HPM 200 (i.e., without the need to perform the conversion operations discussed above) are envisioned as falling within the scope of the present disclosure as well.

In another embodiment, power control operations performed by the power controller 318 in the PMM/DC-MHS HPM interposer 300 may include the performance of PMM hot swap operations that one of skill in the art in possession of the present disclosure will appreciate may include any of a variety of power operations that allow the connected and cabled DC-MHS HPM 200 and PMM/DC-MHS HPM interposer 300 to be connected to the computing device 400 and disconnected from the computing device 400 while the computing device is powered on (with the power system 405 in the computing device 400 is providing power to the PMM connectors 406a and 406b). However, while a few specific examples have been provided, one of skill in the art in possession of the present disclosure will appreciate how the power controller 318 may operate to perform a variety of power control operations for the DC-MHS HPM in a variety of manners that will fall within the scope of the present disclosure as well.

Figure 12:
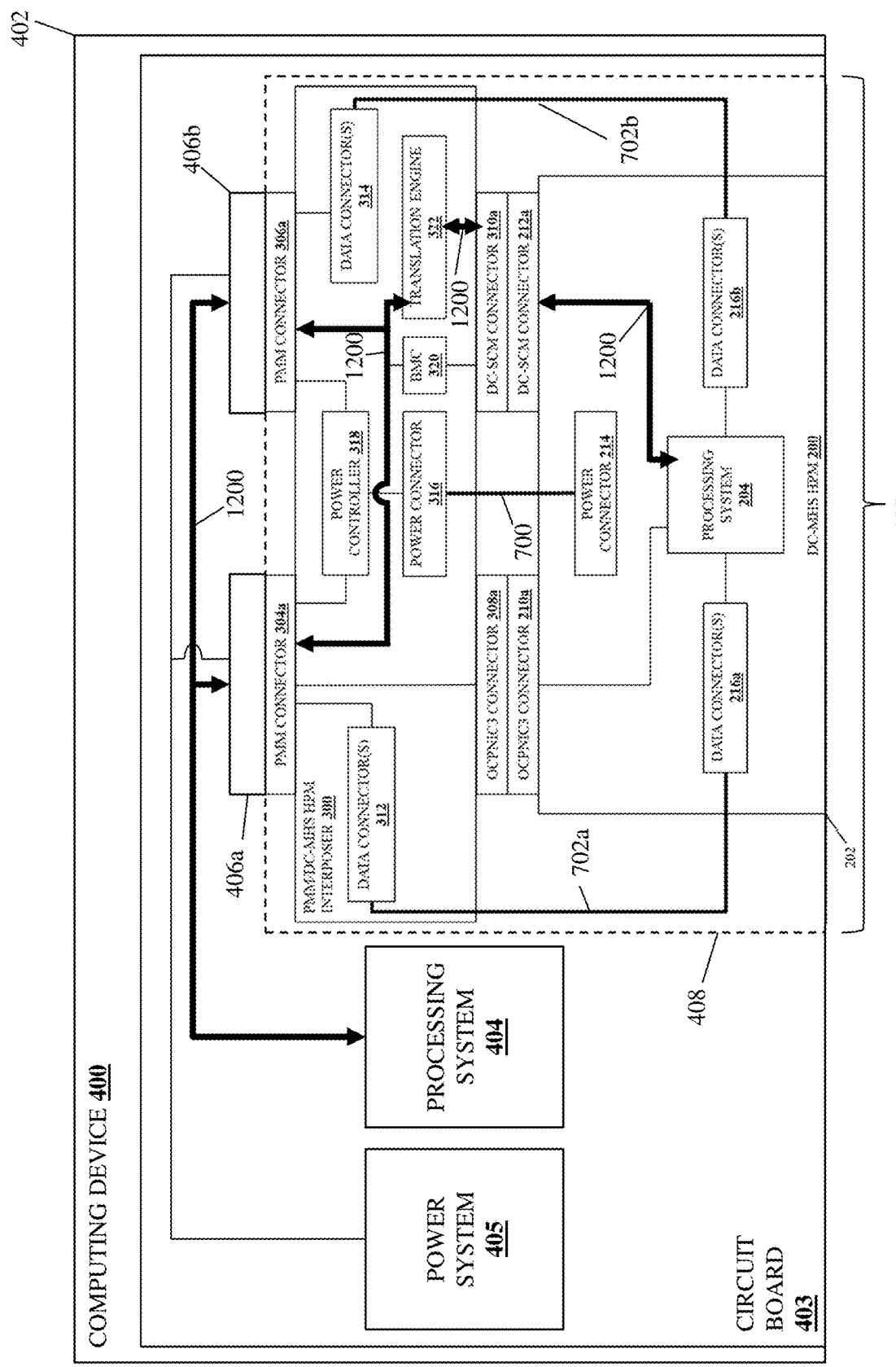
FIG. 12 is a schematic view illustrating an embodiment of the DC-MHS HPM, PMM/DC-MHS HPM interposer, and computing device of FIG. 8B operating during the method of FIG. 5.

The method 500 then proceeds to block 512 where a translation subsystem on the PMM/DC-MHS HPM interposer translates data transmitted between the DC-MHS HPM and the computing device. With reference to FIG. 12, in an embodiment of block 512, the translation engine 322 in the PMM/DC-MHS HPM interposer 300 may perform data translation operations 1200 for data transmitted between the DC-MHS HPM 200 and the computing device 400, and those data translation operations 1200 may include receiving "DC-MHS HPM" communications from the processing system 204 in the DC-MHS HPM 200 via the DC-SCM connectors 310a and 212a, respectively, translating those "DC-MHS HPM" communications to "computing device" communications, and transmitting those "computing device" communications via the PMM connectors 304a/304b and 406a/406b, respectively, to the processing system 404 in the computing device 400.

Similarly, the data translation operations 1200 may include receiving "computing device" communications from the processing system 404 in the computing device 400 via the PMM connectors 304a/304b and 406a/406b, respectively, translating those "computing device" communications to "DC-MHS HPM" communications, and transmitting those "DC-MHS HPM" communications, respectively, to the processing system 204 in the DC-MHS HPM 200 via the DC-SCM connectors 310a and 212a. However, while specific data "translation" operations between the computing device 400 and the DC-MHS HPM 200 have been described, one of skill in the art in possession of the present disclosure will appreciate how the translation engine 322 may perform other operations (e.g., the translation engine 322 may present a highspeed Input/Output (I/O) interface via the PMM connectors 304a and 304b) that enable the functionality described herein.

Thus, systems and methods have been described that provide a PMM/DC-MHS HPM interposer that enables the coupling of a DC-MHS HPM to a computing device via a PMM connector subsystem on the computing device. For example, the PMM/DC-MHS HPM interposer of the present disclosure may include an interposer board having a DC-MHS HPM connector subsystem that connects to a DC-MHS HPM, and a PMM connector subsystem that connects to a computing device. An interposer BMC on the interposer board is coupled to the DC-MHS HPM connector subsystem and configured to perform management operations on a DC-MHS HPM connected to the DC-MHS HPM connector subsystem. A power controller on the interposer board is coupled to the PMM connector subsystem and configured to be cabled to a DC-MHS HPM connected to the DC-MHS HPM connector subsystem. A translation subsystem on the interposer board is coupled to the DC-MHS HPM connector subsystem and the PMM connector subsystem and configured to perform PMM/DC-MHS HPM translations on data transmitted between the DC-MHS HPM connector subsystem and the PMM connector subsystem. As such, DC-MHS HPMs may be utilized with computing devices that do not include dedicated DC-MHS HPM chassis slots/connector subsystems (e.g., via the PMM chassis slots/connectors subsystem on the computing devices as described above).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Pluggable Multipurpose Module (PMM)/Data Center-Modular Hardware System Host Processor Module (DC-MHS HPM) interposer, comprising:
   an interposer board;
   a Data Center-Modular Hardware System Host Processor Module (DC-MHS HPM) connector subsystem that is included on the interposer board and that is configured to connect to a DC-MHS HPM;
   a Pluggable Multipurpose Module (PMM) connector subsystem that is included on the interposer board and that is configured to connect to a computing device;
   an interposer Baseboard Management Controller (BMC) that is included on the interposer board, coupled to the DC-MHS HPM connector subsystem, and configured to perform management operations on a DC-MHS HPM when that DC-MHS HPM is connected to the DC-MHS HPM connector subsystem;
   a power controller that is included on the interposer board, coupled to the PMM connector subsystem, and configured to be cabled to a DC-MHS HPM when that DC-MHS HPM is connected to the DC-MHS HPM connector subsystem; and
   a translation subsystem that is included on the interposer board, coupled to the DC-MHS HPM connector subsystem and the PMM connector subsystem, and configured to perform PMM/DC-MHS HPM translations on data transmitted between the DC-MHS HPM connector subsystem and the PMM connector subsystem.

2. The system of claim 1, further comprising:
   at least one data connector that is included on the interposer board, coupled to the PMM connector subsystem, and configured to be cabled to a DC-MHS HPM when that DC-MHS HPM is connected to the DC-MHS HPM connector subsystem.

3. The system of claim 2, wherein the at least one data connector includes at least one first data connector that provides a 16-lane communication connection between a first PMM connector in the PMM connector subsystem and the DC-MHS HPM when that DC-MHS HPM is cabled to the at least one first data connector, and at least one second data connector that provides a 32-lane communication connection between a second PMM connector in the PMM connector subsystem and the DC-MHS HPM when that DC-MHS HPM is cabled to the at least one second data connector.

4. The system of claim 1, wherein the interposer BMC is coupled to the PMM connector subsystem and configured to perform management operations with a host BMC in a computing device when that computing device is connected to the PMM connector subsystem.

5. The system of claim 1, wherein the PMM connector subsystem includes a pair of PMM connectors that are included in a spaced-apart configuration from each other on the interposer board.

6. The system of claim 1, wherein the DC-MHS HPM connector subsystem includes an Open Compute Project Network Interface Controller (OCPNIC) connector and a Data Center-Secure Control Module (DC-SCM) connector that are included in a spaced-apart configuration from each other on the interposer board.

7. An Information Handling System (IHS), comprising:
a computing device;
a Modular Hardware System Host Processor Module (DC-MHS HPM); and
a Pluggable Multipurpose Module (PMM)/DC-MHS HPM interposer including:
  a DC-MHS HPM connector subsystem that is included on the interposer board and connected to the DC-MHS HPM;
  a PMM connector subsystem that is included on the interposer board and that is connected to the computing device;
  an interposer Baseboard Management Controller (BMC) that is included on the interposer board, coupled to the DC-MHS HPM connector subsystem, and configured to perform management operations on the DC-MHS HPM;
  a power controller that is included on the interposer board, coupled to the PMM connector subsystem, and cabled to the DC-MHS HPM; and
  a translation subsystem that is included on the interposer board, coupled to the DC-MHS HPM connector subsystem and the PMM connector subsystem, and configured to perform PMM/DC-MHS HPM translations on data transmitted between the DC-MHS HPM connector subsystem and the PMM connector subsystem.

8. The IHS of claim 7, further comprising:
at least one data connector that is included on the interposer board, coupled to the PMM connector subsystem, and cabled to the DC-MHS HPM.

9. The IHS of claim 8, wherein the at least one data connector includes at least one first data connector that provides a 16-lane communication connection between a first PMM connector in the PMM connector subsystem and the DC-MHS HPM, and at least one second data connector that provides a 32-lane communication connection between a second PMM connector in the PMM connector subsystem and the DC-MHS HPM.

10. The IHS of claim 7, wherein the interposer BMC is coupled to the PMM connector subsystem and configured to perform management operations with a host BMC in the computing device.

11. The IHS of claim 7, wherein the PMM connector subsystem includes a pair of PMM connectors that are included in a spaced-apart configuration from each other on the interposer board.

12. The IHS of claim 7, wherein the DC-MHS HPM connector subsystem includes an Open Compute Project Network Interface Controller (OCPNIC) connector and a Data Center-Secure Control Module (DC-SCM) connector that are included in a spaced-apart configuration from each other on the interposer board.

13. The IHS of claim 7, wherein the power controller is configured to control power provided by the computing device to the DC-MHS HPM by performing hot swap operations and power conversion operations.

14. A method for connecting a Data Center-Modular Hardware System Host Processor Module (DC-MHS HPM) to a Pluggable Multipurpose Module (PMM) connector subsystem on a computing device using a PMM/DC-MHS HPM interposer, comprising:
connecting, by a Data Center-Modular Hardware System Host Processor Module (DC-MHS HPM) connector subsystem on Pluggable Multipurpose Module (PMM)/DC-MHS HPM interposer, to a DC-MHS HPM;
connecting, by a PMM connector subsystem on the PMM/DC-MHS HPM interposer, to a computing device;
managing, by an interposer Baseboard Management Controller (BMC) on the PMM/DC-MHS HPM interposer that is coupled to the DC-MHS HPM connector subsystem, the DC-MHS HPM;
controlling, by a power controller on the PMM/DC-MHS HPM interposer that is coupled to the PMM connector subsystem and cabled to the DC-MHS HPM, power provided by the computing device to the DC-MHS HPM; and
translating, by a translation subsystem on the PMM/DC-MHS HPM interposer that is coupled to the DC-MHS HPM connector subsystem and the PMM connector subsystem, data transmitted between the DC-MHS HPM connector subsystem and the PMM connector subsystem.

15. The method of claim 14, further comprising:
transmitting, by at least one data connector on the PMM/DC-MHS HPM interposer that is coupled to the PMM connector subsystem and cabled to the DC-MHS HPM, data between the DC-MHS HPM and the computing device.

16. The method of claim 15, wherein the at least one data connector includes at least one first data connector that provides a 16-lane communication connection between a first PMM connector in the PMM connector subsystem and the DC-MHS HPM, and at least one second data connector that provides a 32-lane communication connection between a second PMM connector in the PMM connector subsystem and the DC-MHS HPM.

17. The method of claim 14, further comprising:
performing, by the interposer BMC, management operations with a host BMC in the computing device.

18. The method of claim 14, wherein the PMM connector subsystem includes a pair of PMM connectors that are included in a spaced-apart configuration from each other on the PMM/DC-MHS HPM interposer.

19. The method of claim 14, wherein the DC-MHS HPM connector subsystem includes an Open Compute Project Network Interface Controller (OCPNIC) connector and a Data Center-Secure Control Module (DC-SCM) connector that are included in a spaced-apart configuration from each other on the PMM/DC-MHS HPM interposer.

20. The method of claim 14, wherein the power controller controlling power provided by the computing device to the DC-MHS HPM includes the power controller performing hot swap operations and power conversion operations.

\* \* \* \* \*